US007855986B2

(12) United States Patent  
Tanaka et al.

(10) Patent No.: US 7,855,986 B2  
(45) Date of Patent: Dec. 21, 2010

(54) COMMUNICATION TERMINAL AND METHOD FOR HANDLING POWER OFF TIME

(75) Inventors: Hironori Tanaka, Kurume (JP); Kazuhiko Sakamoto, Kyoto (JP)

(73) Assignee: Panasonic Corporation, Osaka (JP)

( * ) Notice: Subject to any disclaimer, the term of this patent is extended or adjusted under 35 U.S.C. 154(b) by 500 days.

(21) Appl. No.: 11/283,829

(22) Filed: Nov. 22, 2005

(65) Prior Publication Data

US 2006/0153114 A1 Jul. 13, 2006

(30) Foreign Application Priority Data

Nov. 26, 2004 (JP) .............................. 2004-342222  
Jun. 2, 2005 (JP) .............................. 2005-162275

(51) Int. Cl.
 *G08C 17/00* (2006.01)
 *H04B 1/16* (2006.01)
 *H04B 1/38* (2006.01)

(52) U.S. Cl. ...................... 370/311; 455/343.2; 455/574

(58) Field of Classification Search ................. 370/311; 455/574

See application file for complete search history.

(56) References Cited

U.S. PATENT DOCUMENTS

| | | | | |
|---|---|---|---|---|
| 5,276,680 | A | * | 1/1994 | Messenger ................... 370/311 |
| 5,448,773 | A | * | 9/1995 | McBurney et al. ........ 455/343.6 |
| 6,018,642 | A | * | 1/2000 | Adachi ....................... 340/7.33 |
| 6,192,230 | B1 | * | 2/2001 | van Bokhorst et al. ... 455/343.3 |
| 6,917,598 | B1 | * | 7/2005 | Emeott et al. ............... 370/311 |
| 6,973,052 | B2 | * | 12/2005 | Wang et al. .................. 370/278 |
| 7,020,501 | B1 | * | 3/2006 | Elliott et al. ................. 455/574 |
| 7,251,232 | B1 | * | 7/2007 | Meier .......................... 370/338 |
| 7,477,621 | B1 | * | 1/2009 | Loc et al. ..................... 370/329 |

(Continued)

FOREIGN PATENT DOCUMENTS

JP 2001-195161 A * 7/2001

OTHER PUBLICATIONS

IEEE Std 802.11-1997, "Information Technology- telecommunications and Information exchange Between Systems-Local and Metropolitan Area Networks-specific Requirements-part 11: Wireless LAN Medium Access Control (MAC) and Physical Layer (PHY) Specifications", IEEE, Nov. 18, 1997, pp. 73-87.*

(Continued)

*Primary Examiner*—Rafael Pérez-Gutiérrez  
*Assistant Examiner*—Allahyar Kasraian  
(74) *Attorney, Agent, or Firm*—Dickinson Wright PLLC

(57) ABSTRACT

A communication terminal, in case that transmission/reception of a frame is carried out between a management terminal and another communication terminal, reads out its frame content, and on the basis of a content of the frame which was readout, sets up power off time for turning off power of the communication terminal, and turns off power of the communication terminal, during a period of the power off time. By this means, depending on a content of a frame which is transmitted/received between another communication terminal and the management terminal, power off time of the communication terminal is calculated, and therefore, it is possible to turn off power of the communication terminal during such a period that transmission/reception is not carried out to/from the management terminal, and it is possible to suppress power consumption of the communication terminal.

8 Claims, 27 Drawing Sheets

U.S. PATENT DOCUMENTS

| | | |
|---|---|---|
| 7,496,084 B2 * | 2/2009 | Inoue et al. .................. 370/349 |
| 7,522,934 B2 * | 4/2009 | Fukuda ....................... 455/522 |
| 2002/0172186 A1 * | 11/2002 | Larsson ...................... 370/349 |
| 2004/0259542 A1 * | 12/2004 | Viitamaki et al. .......... 455/426.2 |
| 2005/0048960 A1 * | 3/2005 | Yamauchi et al. ........... 455/418 |
| 2005/0122231 A1 * | 6/2005 | Varaiya et al. ......... 340/870.01 |
| 2005/0147115 A1 * | 7/2005 | Li et al. ...................... 370/449 |
| 2005/0201361 A1 * | 9/2005 | Morioka et al. ............. 370/352 |
| 2006/0007935 A1 * | 1/2006 | Bennett et al. ........... 370/395.5 |
| 2006/0165073 A1 * | 7/2006 | Gopinath et al. ............ 370/389 |
| 2006/0165078 A1 * | 7/2006 | Gopinath et al. ............ 370/389 |
| 2009/0147761 A1 * | 6/2009 | Adachi et al. ................ 370/338 |

OTHER PUBLICATIONS

ISO/IEC 8802-11: 1999 (E), ANSI/IEEE Std. 802.11, 1999 Edition, pp. 128-134.

* cited by examiner

FIG. 19A

| PROCESSING ORDER | TERMINAL |
|---|---|
| 1 | 2a |
| 2 | 2b |
| 3 | 2c |

FIG. 19B

| PROCESSING ORDER | TERMINAL |
|---|---|
| 1 | 2b |
| 2 | 2c |
| 3 | 2a |

FIG. 19C

| PROCESSING ORDER | TERMINAL |
|---|---|
| 1 | 2c |
| 2 | 2a |
| 3 | 2b |

FIG. 20A

| PROCESSING ORDER | TERMINAL |
|---|---|
| 1 | 2a |
| 2 | - |
| 3 | - |

FIG. 20B

| PROCESSING ORDER | TERMINAL |
|---|---|
| 1 | 2a |
| 2 | 2b |
| 3 | - |

FIG. 20C

| PROCESSING ORDER | TERMINAL |
|---|---|
| 1 | 2a |
| 2 | 2b |
| 3 | 2c |

FIG. 21A

| TERMINAL | POWER ON TIME PER UNIT TIME (MINUTES) |
|---|---|
| 2a | 30 |
| 2b | 20 |
| 2c | 15 |

FIG. 21B

| TERMINAL | POWER ON TIME PER UNIT TIME (MINUTES) |
|---|---|
| 2a | 32.2 |
| 2b | 23.2 |
| 2c | 14.2 |

FIG. 22A

| PROCESSING ORDER | TERMINAL |
|---|---|
| 1 | 2c |
| 2 | - |
| 3 | - |

FIG. 22B

| PROCESSING ORDER | TERMINAL |
|---|---|
| 1 | 2a |
| 2 | 2c |
| 3 | - |

FIG. 22C

| PROCESSING ORDER | TERMINAL |
|---|---|
| 1 | 2a |
| 2 | 2b |
| 3 | 2c |

FIG. 23A

| TERMINAL | BATTERY REMAINING QUANTITY (mAh) |
|---|---|
| 2a | 300 |
| 2b | 500 |
| 2c | 700 |

FIG. 23B

| TERMINAL | BATTERY REMAINING QUANTITY (mAh) |
|---|---|
| 2a | 255.1 |
| 2b | 435.2 |
| 2c | 615.4 |

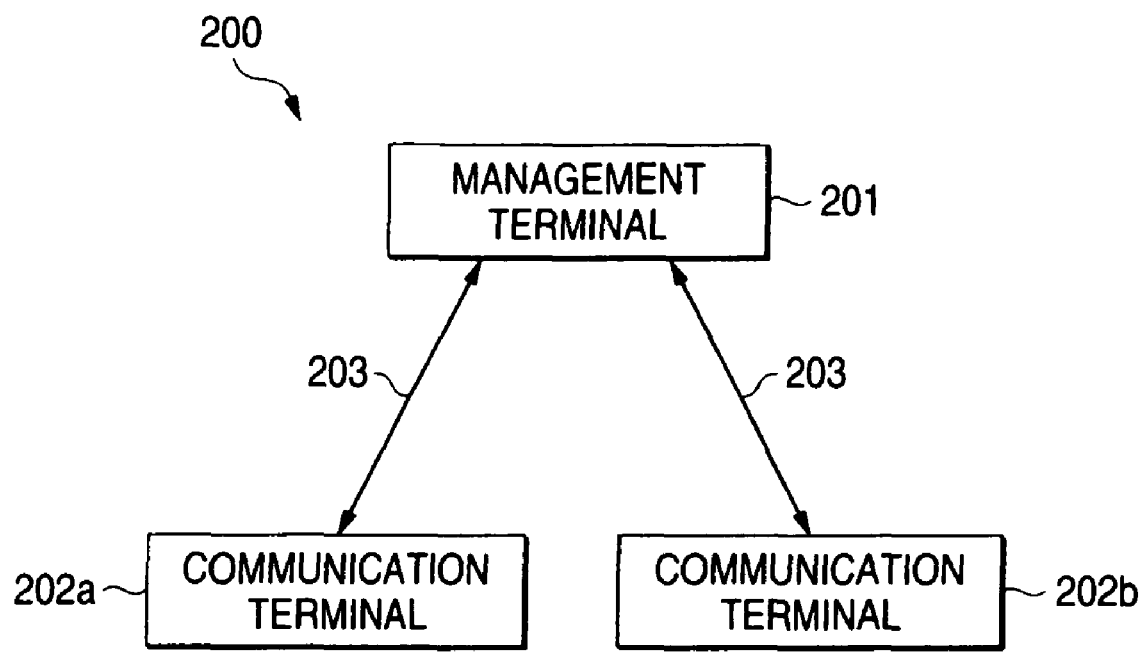

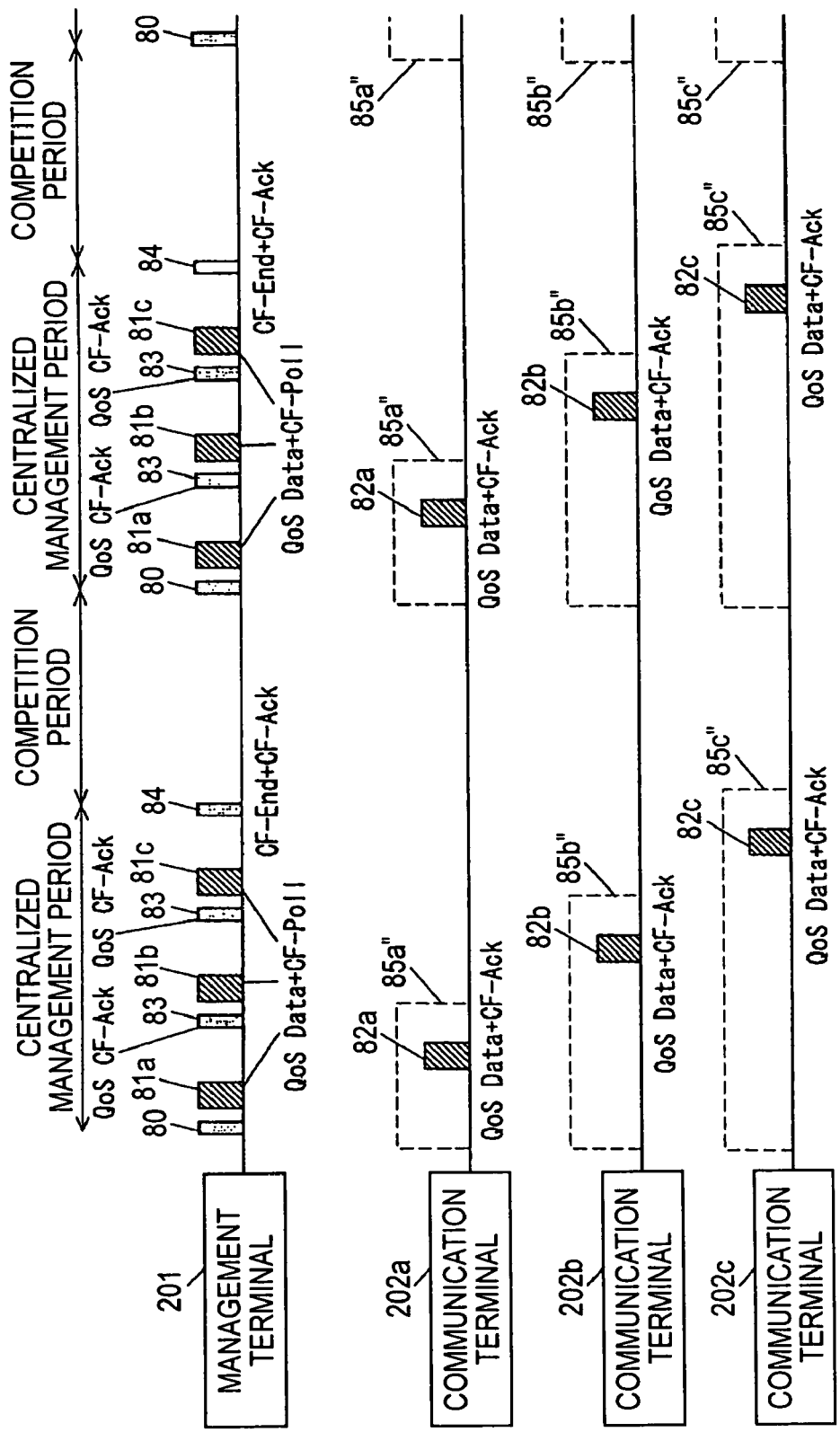

COMMUNICATION TERMINAL AND METHOD FOR HANDLING POWER OFF TIME

FIELD OF THE INVENTION

This invention relates to a communication system in which a management terminal manages transmission/reception of a frame through a network, to/from each communication terminal, and more particularly, relates to a communication system which can suppress power consumption of a communication terminal, by turning off power of a communication terminal which does not carry out transmission/reception during such a period that a management terminal and another communication terminal are transmitting/receiving a frame.

BACKGROUND

In IEEE (Institute of Electrical and Electronic Engineers) 802.11 which is a standard of wireless LAN (Local Area Network) and IEEE802.11e which is expected to become widely used from now on, and is further a standard for securing QoS (Quality of Services), a frame transmission/reception method of a communication terminal for which power saving is carried out is defined.

Hereinafter, a related communcation system 200 of FIG. 24 will be describe.

FIG. 24 is a block diagram which shows the related communication system 200. FIG. 25 is a block diagram which shows a physical layer frame of IEEE802.11. FIGS. 26 and 27 are time charts which show operations of the related communication system 200.

In FIG. 24, the related communication system 200 has a management terminal 201, and communication terminals 202a, 202b, . . . . The management terminal 201 is connected to wired LAN (first network) such as Internet, through a LAN cable and a coaxial cable which are not shown in the figure. In addition, the management terminal 201 is connected to wireless LAN (second network) through an invisible wireless communication path 203. That is, the management terminal 201 is connected to the communication terminals 202a, 202b, . . . respectively, through the wireless communication path 203, and manages transmission/reception of a frame to/from the communication terminals 202a, 202b, . . . through the wireless LAN.

In FIG. 25, 204 designates a physical layer frame of IEEE802.11 which is transmitted to the air. 205 designates a PHY (Physical Layer) header which is added in a physical layer. The PHY header 205 shows a data rate and a data link layer frame length 206 designates a data link layer frame of IEEE802.11. 207 designates a MAC (Medium Access Control) header, and the MAC header 207 shows what kind of frame the frame is, whether power saving is carried out, a destination address, a source address, etc. 208 designates a frame body. The frame body 208 stores various data depending on a content of the MAC header 207. 209 designates FCS (Frame Check Sequence), and it shows 32 bit CRC (Cyclic Redundancy Code) which was calculated from the MAC header 207 and the frame body 208, in order to confirm reasonability of contents of the MAC header 207 and the frame body 208.

Firstly, in case that the communication terminals 202a, 202b, which are in a power saving status on the basis of IEEE802.11 standard, receive data from the management terminal 201, an operation of the related communication system 200 having only a competition period for obtaining a transmission right (i.e., having no centralized management period which will be described later) will be described along FIG. 26. FIG. 26 is a time chart which shows an operation of the related communication system 200 having only the competition period.

In FIG. 26, when the management terminal 201 wishes to transmit data to the communication terminals 202a, 202b, it is not known whether the communication terminals 202a, 202b stay awake from the power saving status, and therefore, it is not possible to transmit a frame from the management terminal 201 at arbitrary timing. Then, at a time point t11, the management terminal 201 transmits a beacon frame 63 which shows that there is also data which is desired to be transmitted to the communication terminals 202a, 202b. The communication terminals 202a, 202b know that there exists data addressed to themselves in the management terminal 201, respectively, by receiving all beacon frames 63.

In order to request data to the management terminal 201, there is such a necessity that the communication terminal 202a transmits a PS (Power Save)-POLL frame 64a to the management terminal 201 and the communication terminal 202b transmits a PS-POLL frame 64b to the management terminal 201, and, in FIG. 26, there is only a competition period, and therefore, the communication terminals 202a, 202b are to compete with each other.

For example, assuming that the communication terminal 202a wins this competition, the communication terminal 202a transmits the PS-POLL frame 64a to the management terminal 201 at a time point t12. The management terminal 201, when it receives the PS-POLL frame 64a, transmits, at a time point t13, a data frame 65a which shows that data addressed to the communication terminal 202a is only this frame by the MAC header 207, having a short frame interval called as SIFS (Short Interframe Space), to the communication terminal 202a.

The communication terminal 202a, when it receives the data frame 65a, transmits, at a time point t14, a fixed length ACK frame 66a which shows that it received the data frame 65a, having a frame interval of SIFS, to the management terminal 201. As already described above, the data frame 65a shows that data addressed to the communication terminal 202a is only this frame, and therefore, in case that there is no data in the management terminal 201 and in addition, there is no data addressed to the management terminal 201 even in the communication terminal 202a, the communication terminal 202a turns off power until a time point t17 where it turns on power, in order to be able to receive a next beacon frame 63 (time point t18). Therefore, a power-on period of the communication terminal 202a in this case turns out to be as shown by 67a (broken line), from a time point t10 until a time point t15.

On the one end, the communication terminal 202b, which lost the competition right after a first beacon frame 63, continues to be in a power-on status after that, and is competing, and continues to be beaten by the data frame 65a and the ACK frame 66a, and obtains a right of transmission for the first time, after completion of the ACK frame 66a at a time point t14, and transmits the PS-POLL frame 64b at a time point t15.

In case that the management terminal 201 has also only one of data addressed to the communication terminal 202b, the same processing as already described above will be carried out after that. Further, in case that there is no data addressed to the management terminal 201 in the communication terminal 202b, in the same manner as in the communication terminal 202a, it turns off power until the time point t17 where it turns on power, in order to be able to receive the next beacon frame 63 (time point t18). Therefore, a power-on period of the communication terminal 202b in this case turns out to be as shown by 67b (broken line), from the time point t10 until the time point t15.

Then, in case that the communication terminals 202a, 202b, which are in a power saving status on the basis of the IEEE802.11 standard, receive data from the management terminal 201 like a voice call, and after that, transmit data to the management terminal 201, an operation of the related communication system 200 having a centralized management period and a competition period will be described along FIG. 27. FIG. 27 is a time chart which shows an operation of the related communication system 200 having a centralized management period and a competition period.

In FIG. 27, By using IEEE802.11e, QoS is secured and audio data is transferred. When the management terminal 201 wishes to transmit data to the communication terminals 202a, 202b, it is known that the communication terminals 202a, 202b stay awake during a period of a centralized management period although the communication terminals 202a, 202b are in a power saving status, and therefore, it is possible to transmit a frame from the management terminal 201 at arbitrary timing.

Inversely, when the communication terminals 202a, 202b wish to transmit data to the management terminal 201 during the centralized management period, it is not possible to transmit data unless the management terminal 201 gives permission. In addition, the management terminal 201, in case that it terminates the centralized management period earlier than a period which was notified in the beacon frame 63, has to notify the termination of the centralized management period to the communication terminals 202a, 202b.

Firstly, at a time point t21, the management terminal 201 transmits the beacon frame 63 which shows that there is also data which is desired to be transmitted to the communication terminals 202a, 202b. The communication terminals 202a, 202b know that there exists data addressed to themselves in the management terminal 201, respectively, and they enter into a centralized management period, since they are to receive all beacon frames 63. In the centralized management period, as described above, the communication terminals 202a, 202b continue to be awake, and the management terminal 201 transmit, at a time point t22, a QoS data+CF-Poll frame 69a which carries out transmission of data addressed to the communication terminal 202a and permission of data from the communication terminal 202a at the same time, to the communication terminal 202a.

When the communication terminal 202a, in case that it has data addressed to the management terminal 201, receives the QoS data+CF-Poll frame 69a, it transmits, at a time point t23, a QoS data+CF-Ack frame 70a which carries out showing that it received the QoS data+CF-Poll frame 69a during the centralized management period and data transmission to the management terminal 201, at the same time, to the management terminal 201.

The management terminal 201, when it receives the QoS data+CF-Ack frame 70a, transmits a QoS CF-Ack frame 71 which shows that it received data from the communication terminal 202a during the centralized management period, to the communication terminal 202a. The communication terminal 202a, when it receives the QoS CF-Ack frame 71, notifies to the management terminal 201 such a thing that there exist no other data in the management terminal 201, by a content of the MAC header 207 of the QoS data+CF-Poll frame 69a, and notifies to the management terminal 201 such a thing that there is no other data even in itself, by the QoS data+CF-Ack frame 70a, and therefore, it turns off power until a time point t28 where it turns on power, in order to be able to receive a next beacon frame 63 (time point t29). Therefore, power-on time of the communication terminal 202a in this case turns out to be as shown by 67a (broken line), from a time point t20 until a time point t25.

On the one hand, the communication terminal 202b continues to be turned power-on for quite a while since there is no instruction from the management terminal 201, and at the time point t25, the management terminal 201 transmits a QoS data+CF-Poll frame 69b, to the communication terminal 202b.

By the received the QoS data+CF-Ack frame 69b, processing, which was already described, is carried out, and at a time point t26, the management terminal 201 transmits a CF-End+CF-Ack frame 72, in lieu of the QoS CF-Ack frame 71. This is because of notifying to terminate the centralized management period, since there is no data in both of the management terminal 201 and the communication terminals 202a, 202b.

At a time point t27, the communication terminal 202b turns off power until a time point t28 where it turns on power, in order to be able to receive a next beacon frame 63 (time point t29), in the same manner as in the communication terminal 202a. Power-on time of the communication terminal 202b in this case turns out to be as shown by 67b (broken line), from the time point t20 until the time point t27.

These specifications are shown in the IEEE802.11 standard (e.g., see, "ANSI/IEEE Standard 802.11", 1999, P. 128-133).

However, in the above-described communication system, a communication terminals, which terminated transmission/reception of data earlier, enters into a power saving status, but a communication terminal, which has not yet done transmission/reception of data, has to keep awake, even during such a period that another communication terminal is transmitting/receiving, and therefore, electric power is consumed wastefully, and especially, in case that a communication terminal carries out a voice call, there was such a problem that duration of call shortens.

The invention aims, in view of the above-described problems, to provide a communication system, a communication terminal, and a communication method, which can suppress power consumption of a communication terminal, by turning off power of a communication terminal which does not carry out transmission/reception, during such a period that a management terminal is transmitting to/receiving from another communication terminal.

SUMMARY

The invention is a communication system comprising a management terminal connected to a first network, and a plurality of communication terminals connected to the management terminal through a second network, the management terminal managing transmission/reception of a frame to/from each communication terminal through the second network, wherein the communication terminal comprises a frame reception section which receives, in case that transmission/reception of a frame is carried out between the management terminal and another communication terminal, the frame, a frame content readout section which reads out a content stored in the frame which was received by the frame reception section, a power off time setup section which sets out power off time for turning off power of the communication terminal, on the basis of the content of the frame which was read out by the frame content readout section, and a power off section which turns off power of the communication terminal, during a period of the power off time which was set up by the power off time setup section.

By this means, power off time of a communication terminal is set up, depending on a content of a frame which is transmitted/received between another communication terminal and the management terminal, and therefore, it is possible to turn off power of the communication terminal, during such a period that it does not carry out transmission/reception to/from the management terminal, and it is possible to suppress power consumption of the management terminal.

In addition, the invention is a communication system which is configured by a management terminal which manages a medium, and a communication terminal which can change power on and power off, which are managed by the management terminal, at arbitrary timing, and configured in such a manner that the communication terminal carries out power on in tune with start of each reference frame of the management terminal, and the management terminal notifies frame stored information which represents existence of a frame addressed to the communication terminal, to the communication terminal within the reference frame, and the communication terminal, in case that a frame addressed to its own terminal is not stored, turns off power, and in case that the frame addressed to its own terminal is stored, carries out transmission/reception of a frame to/from the management terminal, and carries out power off when transmission/reception of all frames is completed.

By this means, it is possible to reduce electric power which is consumed wastefully by a communication terminal for which a processing order from the reference frame is late.

BRIEF DESCRIPTION OF THE SEVERAL VIEWS OF DRAWING

FIG. 19 is a view which shows a processing order management table in an embodiment 7 of the invention;

FIG. 20 is a view which shows a processing order management table in an embodiment 8 of the invention;

FIG. 21 is a view which shows a processing order management table in an embodiment 9 of the invention;

FIG. 22 is a view which shows a processing order management table in the embodiment 9 of the invention;

FIG. 23 is a view which shows a battery remaining quantity management table in an embodiment 10 of the invention;

FIG. 24 is a block diagram of a communication system in related art;

FIG. 28 is a time chart which shows an operation of the communication system in the related art.

DETAILED DESCRIPTION

Hereinafter, each embodiment of the invention will be described, and contents of respective embodiments can be utilized mutually.

Embodiment 1

Figure 1:
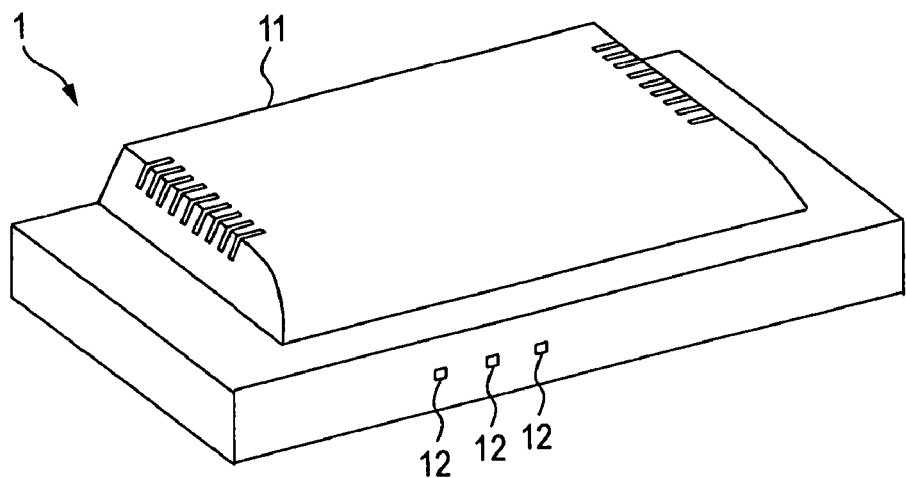
FIG. 1 is an external appearance perspective view which shows a front surface of one example of a management terminal in an embodiment 1 of the invention.
Figure 2:
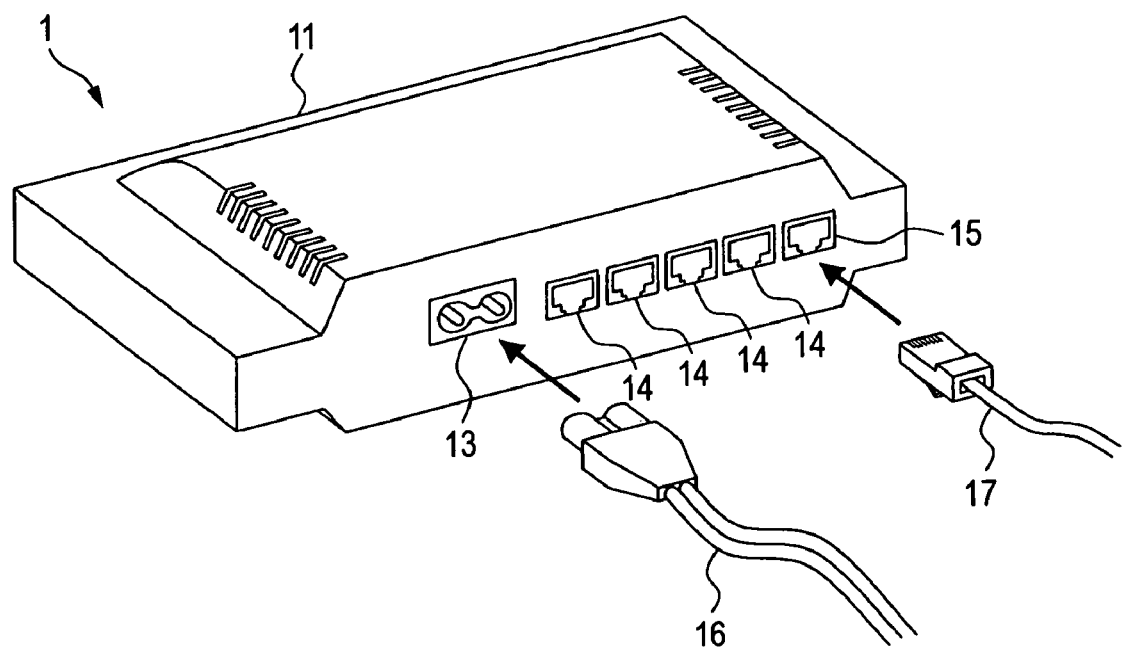
FIG. 2 is an external appearance perspective view which shows a back surface of one example of the management terminal in the embodiment 1 of the invention.

FIG. 1 is an external appearance perspective view which shows a front surface of one example of a management terminal, and FIG. 2 is an external appearance perspective view which shows a back surface of one example of the management terminal.

A management terminal 1 in this embodiment is a router as shown in FIG. 1. The management terminal 1 has a housing 11, and on a front surface of the housing 11, a display section 12 such as LED (Light Emitting Diode) is disposed. On a back surface of the housing 11, as shown in FIG. 2, a DC (DirectCurrent) power connector 13, a LAN modular jack 14 such as RJ45, and a WAN (Wide Area Network) modular jack 15 are disposed. To the DC power connector 13, a power wire 17 such as a parallel cable is connected, as shown in FIG. 2. To the modular jacks 14, 15, a LAN cable 17 is connected. Meanwhile, as one example of the management terminal, the router of FIGS. 1 and 2 was shown, but there is particularly no need to limit to this, and it is also all right even if the management terminal is a device which is equipped with a function of an access point (e.g., household electrical appliance such as television).

Figure 3:
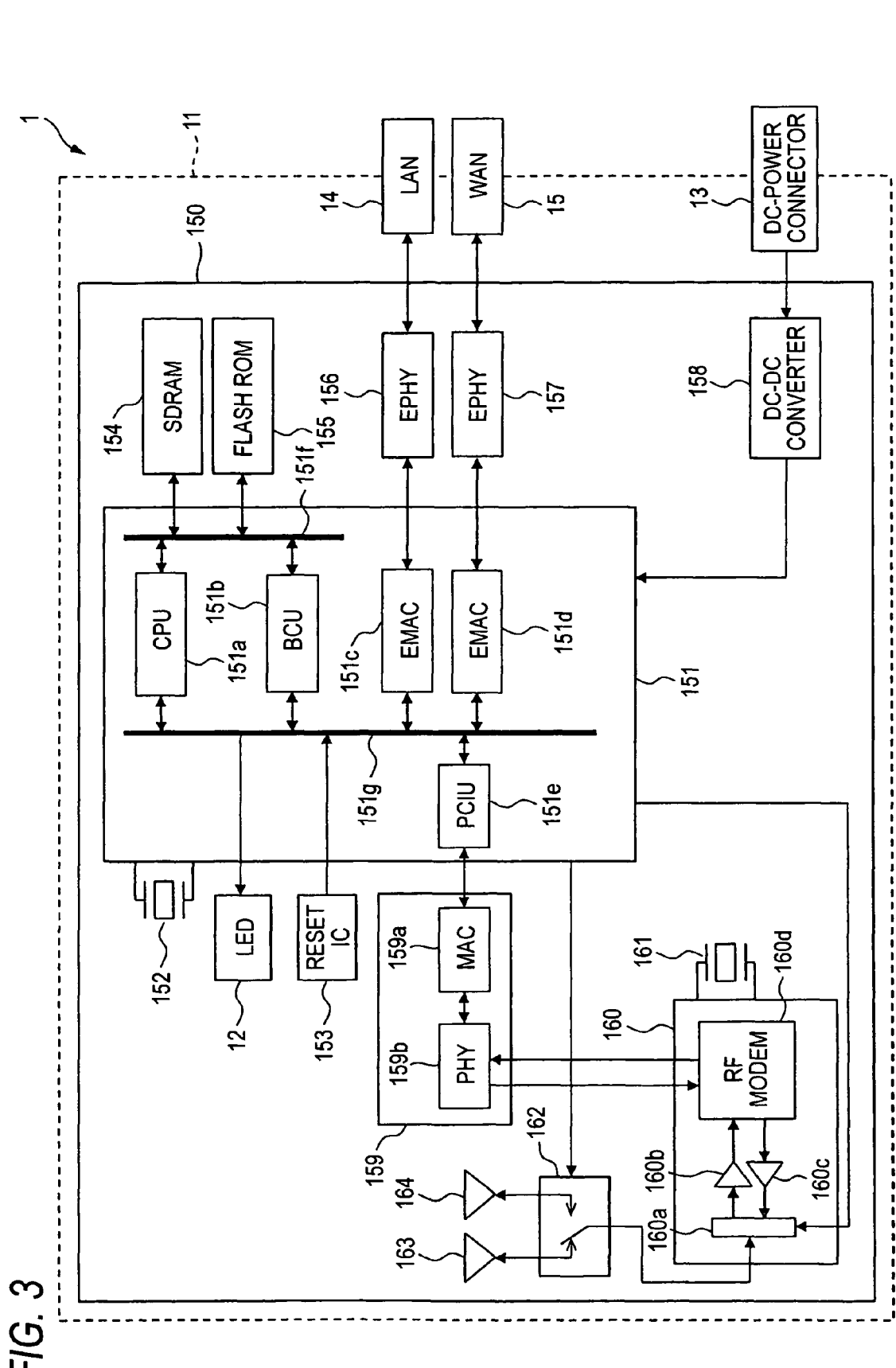
FIG. 3 is a block diagram which shows one example of hardware of the management terminal in the embodiment 1 of the invention.

FIG. 3 is a block diagram which shows one example of hardware of the management terminal.

The management terminal 1 has a circuit module 150 in the housing 11 shown by a broken line, as shown in FIG. 3. In the circuit module 150, a main IC (Integrated Circuit) 151, a wireless LAN controller 159, and a wireless module 160 are mounted.

The main IC 151 has CPU (Central Processing Unit) 151*a*, a bus such as a main bus 151*f* and a local bus 151*g*, BCU (Bus Control Unit) 151*b* which controls a flow of data on the bus, MAC blocks (EMAC) 151*c*, 151*d* which control a MAC layer of Ethernet (registered trademark), and PCIU 151*e* which controls a PCI (Peripheral Component Interconnect Unit) bus.

CPU 151*a* and BCUI 151*b* in the main IC 151 are connected to SDRAM (Synchronous Dynamic Random Access Memory) 154 and Flash ROM (Flash Read Only Memory) 155 through the main bus 151*f*. In addition, CPU 151*a* and BCUI 151*b* are connected to an oscillator 152 which supplies clocks to the main IC 151, the display section 12 such as LED, and a reset IC 153 which outputs an initialization signal to the main IC 151, through the local bus 151*b*.

MAC blocks 151*c*, 151*d* in the main IC 151 are connected to PHY-ICs 156, 157 which control a physical layer of Ethernet (registered trademark), respectively, and PHY ICs 156, 157 are connected to the WAN modular jack 14 and the LAN modular jack 15, respectively. In addition, the main IC 151 is connected to the DC power connector 13, through a DC-DC (Direct Current to Direct Current) converter 158. The DC-DC converter 158 converts a DC voltage which is supplied from the DC power connector 13, into a DC voltage which is necessary for the main IC 151.

The wireless LAN controller 159 has a MAC block 159*a* which controls a MAC layer, and a PHY block 159*b* which controls a physical layer. PCIU 151*e* in the main IC 151 is connected to the PHY block 159*b* through the MAC block 159*a*.

The wireless module 160 is set up as to its transmission or reception status from the main IC 151, and has a transmission/reception changeover SW (Switch) 160*a*, LNA (Low Noise Amplifier) which amplifies a reception signal, PA (Power Amplifier) 160*c* which amplifies a transmission signal, and a RF (Radio Frequency) modem 160*d* which carries out modulation to a wireless signal and demodulation from a wireless signal.

The wireless module 160 is connected to an oscillator 161 which supplies clocks to the wireless module 160, and the RF modem 160*d* in the wireless module 160 is connected to the PHY block 159*b* in the wireless LAN controller 159. The transmission/reception changeover SW 160*a* in the wireless module 160 is connected to antennas 163, 164 through an antenna changeover SW 162 which changes over an antenna to be used from the main IC 151.

Figure 4:
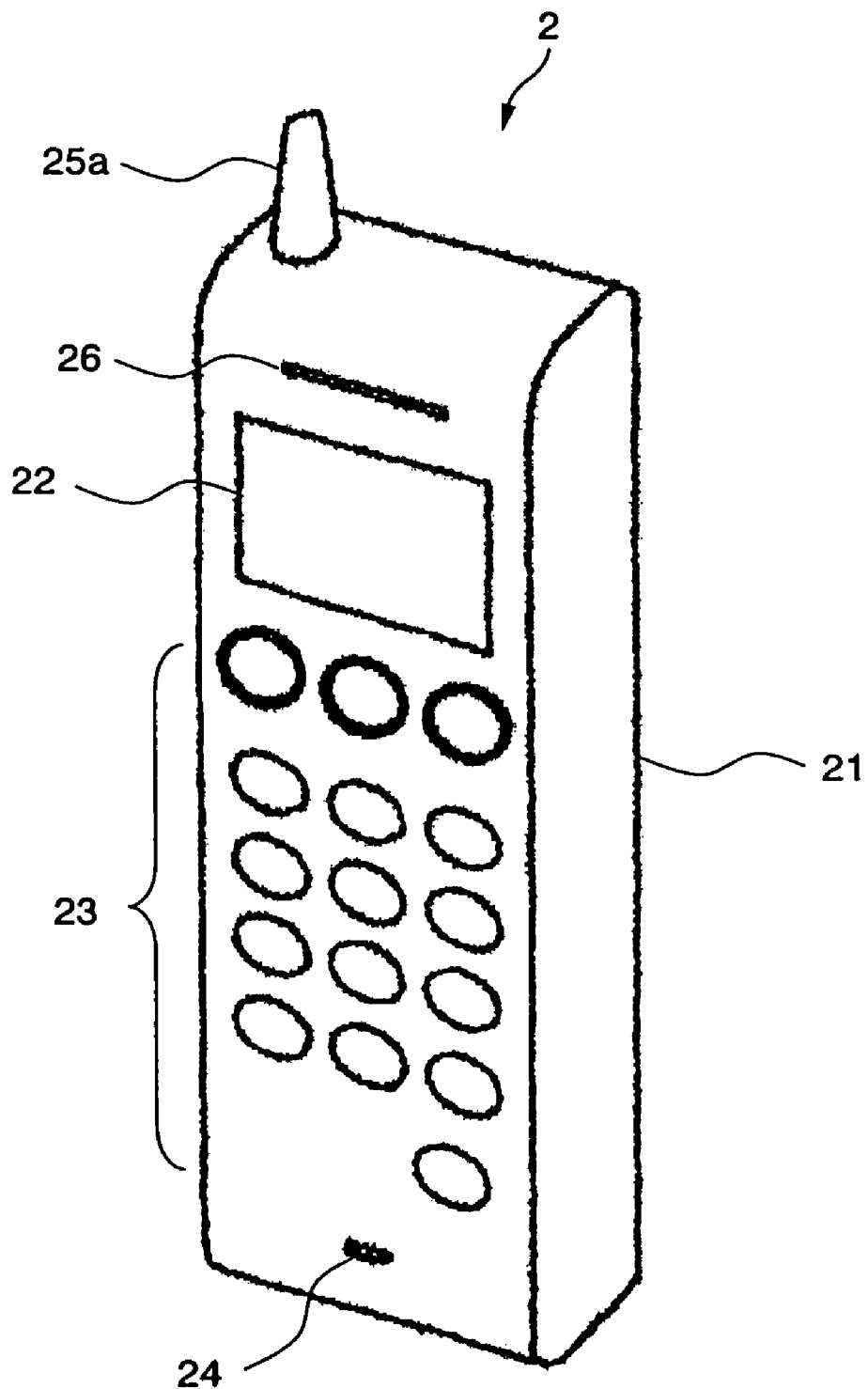
FIG. 4 is an external appearance perspective view which shows one example of a communication terminal in the embodiment 1 of the invention.

FIG. 4 is an external appearance perspective view which shows one example of a communication terminal.

The communication terminal 2 in this embodiment is a portable telephone as shown in FIG. 4. The communication terminal 2 has a housing 21, and in the housing 21, LCD (Liquid Crystal Display) 22 which displays a telephone number etc., a key matrix 23 which is configured by buttons etc. for specifying a telephone number etc., a microphone 24, an external antenna which transmits/receives electromagnetic waves, and a speaker 26 which outputs voices from a conversation partner are disposed. Meanwhile, as one example of the communication terminal, the telephone of FIG. 4 was shown, but there is particularly no need to limit to the telephone, and it is also all right even if the communication terminal is a device which is equipped with such a function that it is connectable to an access point (e.g., electronic device such as a personal computer).

Figure 5:
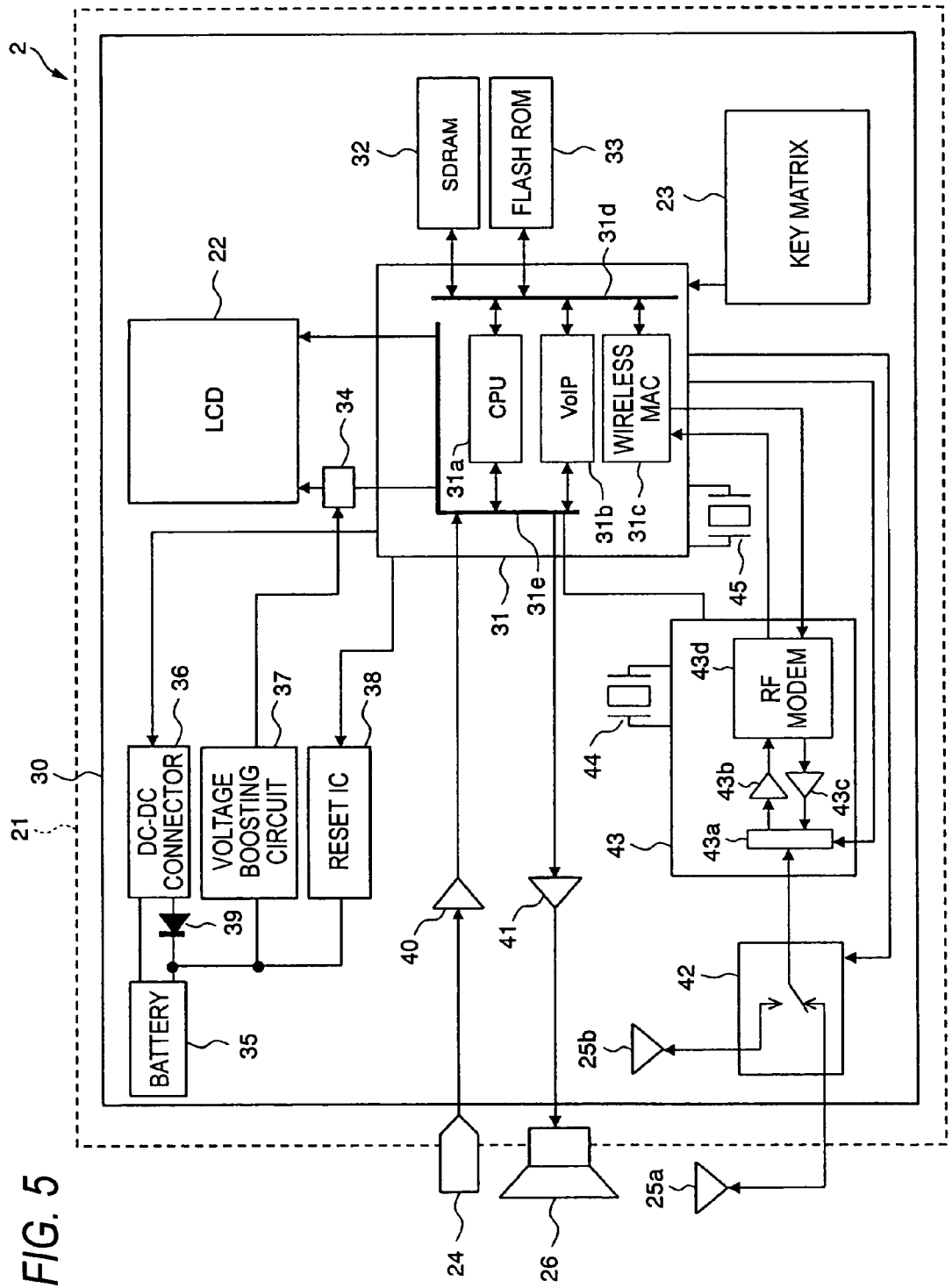
FIG. 5 is a block diagram which shows one example of hardware of the communication terminal in the embodiment 1 of the invention.

FIG. 5 is a block diagram which shows one example of hardware of the communication terminal.

The communication terminal 2 has, as shown in FIG. 5, a circuit module 30 in the housing 21 shown by a broken line.

In the circuit module 30, in addition to LCD 22 and the key matrix 23 which were explained in FIG. 4, a base band IC 31 and a wireless module 43 are mounted.

The base band IC 31 has CPU 31*a*, VoIP (Voice over Internet Protocol) block 31*b* which carries out voice processing, a wireless MAC block 31*c* which controls a MAC layer of a wireless LAAN, and a bus such as a main bus 41*d* and a local bus 31*e*.

CPU 31*a*, the VoIP block 31*b* and the wireless MAC block 31*c* in the base band IC 31 are connected to SDRAM 32 and Flash ROM 33 through the main bus 31*d*. In addition, CPU 31*a*, and the VoIP block 31*b* are connected, through the local bus 31*e*, to LCD 22, LCD power control IC 34 which controls electric power of LCD, a DC-DC converter 36 which converts into a necessary DC voltage, and reset IC 38 which outputs an initialization signal of the base band IC 31. The DC-DC converter 36 is connected to a battery 35 through a diode 39, and the reset IC 38, and a voltage boosting circuit 37 for LCD power, which boosts to a voltage which is necessary for LCD 22 are connected to the battery 35.

In addition, CPU 31*a* and the VoIP block 31*b* are connected, through the local bus 31*e*, to an amplifier which amplifies a signal from the microphone 24, and an amplifier 41 which amplifies a signal to the speaker 26. The amplifiers 40, 41 are connected to the microphone 24 and the speaker 26, respectively. Further, the base band IC 31 is connected to a key matrix 23, a converter 45 which supplies clocks to the base band IC, a wireless module 43, and an antenna changeover SW 42 which changes over an antenna to be used from the base band IC 31.

The wireless module 43 has a transmission/reception changeover SW 43*a*, LNA 43*b* which amplifies a reception signal, PA 43*c* which amplifies a transmission signal, and a RF modem 43*d* which carries out modulation to a wireless signal and demodulation from a wireless signal. In addition, the wireless module 43 is connected to an oscillator 44 which supplies clocks to the wireless module 43, and an antenna changeover SW 42. The antenna changeover SW 42 is connected to the external antenna 25*a* which was explained in FIG. 5, and an internal antenna 25*b*.

Figure 6:
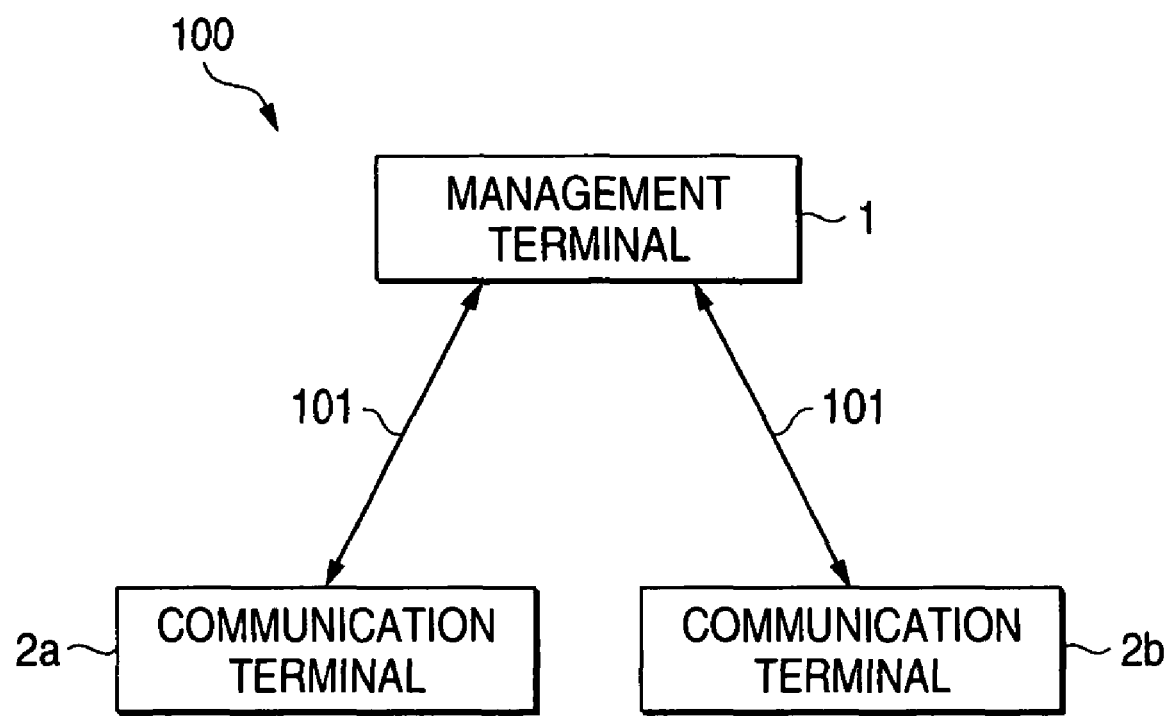
FIG. 6 is a block diagram of a communication system in the embodiment 1 of the invention.

FIG. 6 is a block diagram of a communication system in the embodiment 1 of the invention.

In FIG. 6, a communication system 100 according to the invention, has a management terminal 1, and communication terminals 2*a*, 2*b*, . . . . Here, in order to facilitate understanding of the invention, such a case that there are only two communication terminals 2*a*, 2*b* will be described.

The management terminal 1, for example, manages transmission/reception of a frame to/from the communication terminals 2*a*, 2*b*, through a wireless LAN, and as the management terminal 1, for example, there are a router, an access point and so on. As the communication terminals 2*a*, 2*b*, for example, there are an IP (Internet Protocol) telephone, PDA (Personal Digital Assistant) and so on.

Figure 7:
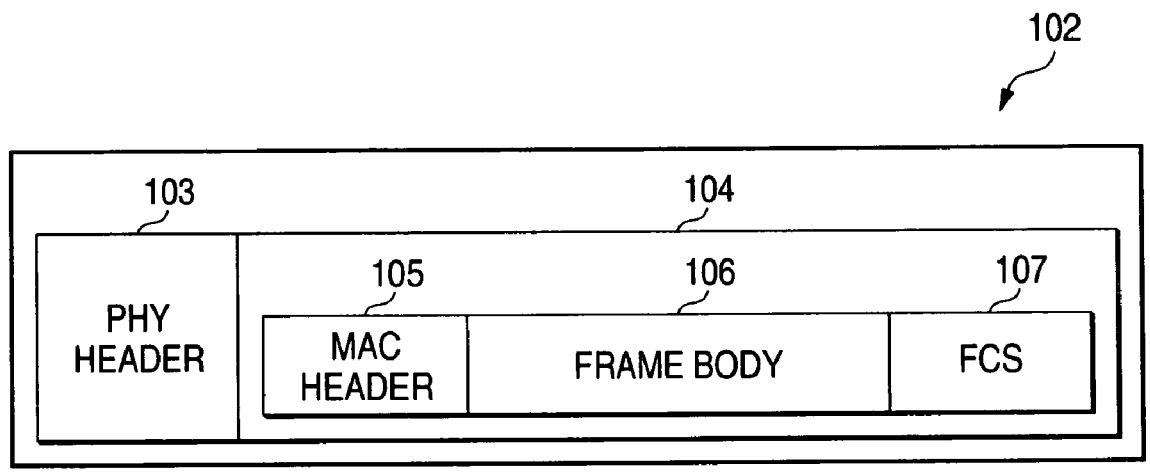
FIG. 7 is a block diagram of a physical layer frame of IEEE802.11 in the embodiment 1 of the invention.

FIG. 7 is a block diagram which shows a physical layer frame of IEEE802.11.

In FIG. 7, 102 designates a physical layer frame of IEEE802.11 which is transmitted through a wireless communication path 101 in the air.

103 designates a PHY header which is added in the physical layer. The PHY header 15 shows a data rate and a data link layer frame length. 104 designates a data link layer frame of IEEE802.11. 105 designates a MAC header, and the MAC header 105 shows what kind of frame it is, whether power saving is carried out, a destination address, a source address etc. 106 designates a frame body. In the frame body 106, various data is stored depending on a content of the MAC header 105. 107 designates FCS, and shows 32 bit CRC which was calculated from the MAC header 105 and the frame body 106, in order to confirm reasonableness of contents of the MAC header 105 and the frame body 106.

Figure 8:
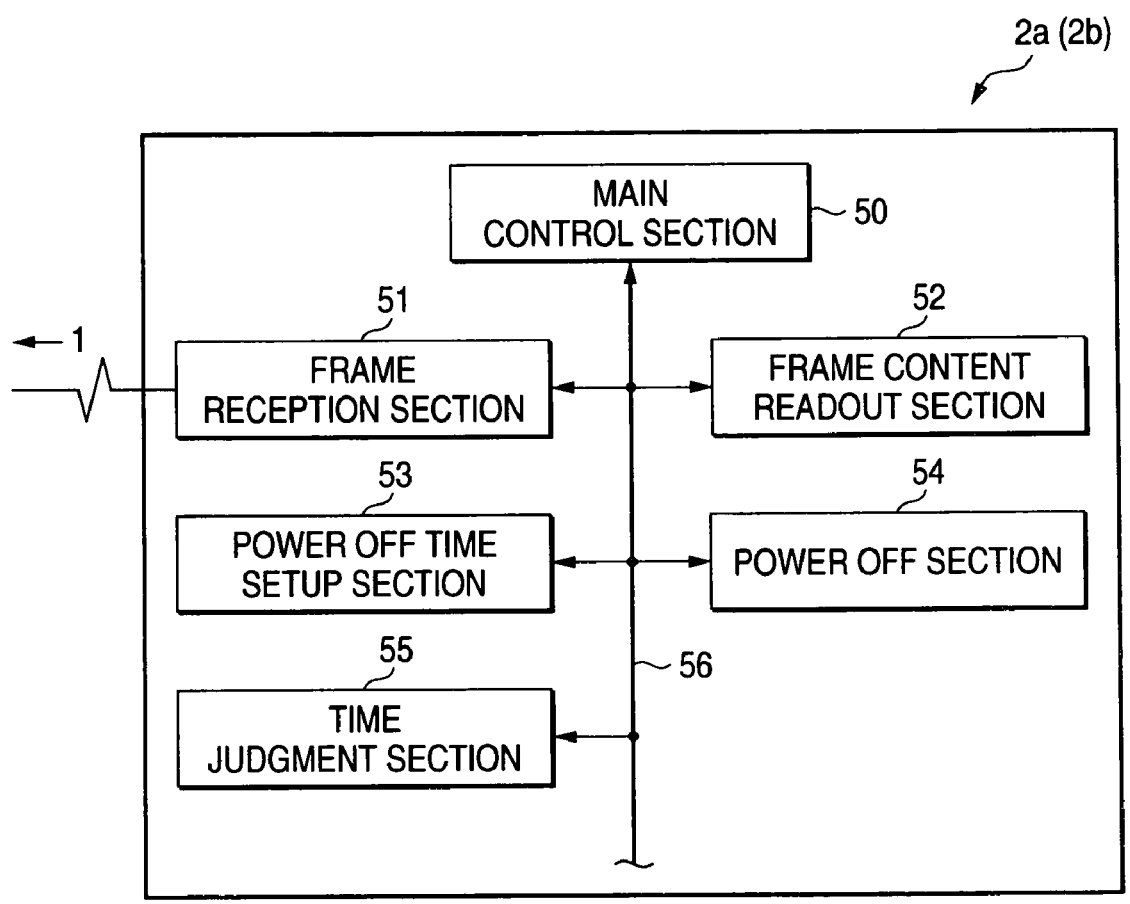
FIG. 8 is a functional block diagram of the communication terminal in the embodiment 1 of the invention.

FIG. 8 is a functional block diagram of the management terminal in the embodiment 1 of the invention.

As shown in FIG. 8, the communication terminals 2a, 2b have a main control section 50. To the main control section 50, a frame reception section 51, a frame content readout section 52, a power off time setup section 53, a power off section 54, and a time judgment section 55 are connected, through a bus line 56. The frame reception section 51 is connected to the management terminal 1 shown in FIG. 6.

Here, a relation of a functional configuration shown in FIG. 8 and a hardware configuration shown in FIG. 5 will be described.

The frame reception section 51 is realized by the wireless module 43. The main control section 50, the frame content readout section 52, the power off section 54, and the time judgment section 55 are realized by such a matter that a processor in the base band IC executes various programs.

Meanwhile, power off processing in the power off section 54 indicates to include processing for turning off at least partial electric power of the wireless module 43, which is shown in FIG. 5, or all electric power, but it is also all right even if another circuit is included. In addition, power saving is accomplished by carrying out not only processing for turning off electric power but also processing for letting down luminance, for example, in case of LCD 22.

Further, in case that the communication terminal 2 is a commonly used data communication dedicated terminal which does not includes a telephone function, it is all right even if electric power off control is carried out so as to be turned into such a status that only CPU 31a in the base band IC 31 functions.

An operation of the communication system 100 with the above-described configuration will be hereinafter described.

Figure 9:
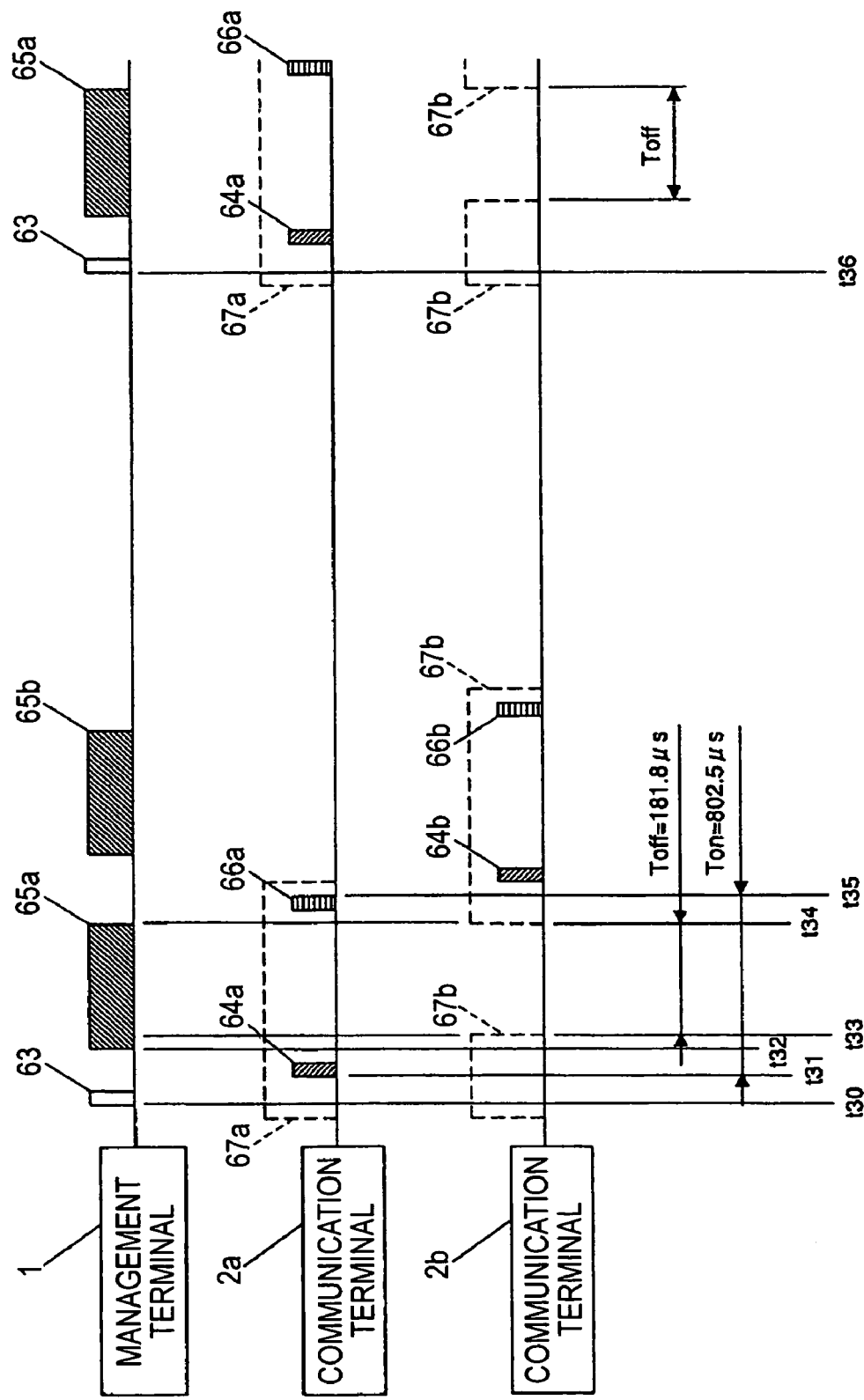
FIG. 9 is a time chart which shows an operation of the communication system in the embodiment 1 of the invention.

FIG. 9 is a time chart which shows an operation of the communication system in the embodiment 1 of the invention.

In FIG. 9, basic operations of the management terminal 1 and the communication terminal 2a are the same as those of related art which were already described. In addition, all frames meet a standard of 802.11b. Concretely speaking, SIFS is of 10 μs, and a PHY header 103 (see, FIG. 7) is of 192 μs. And a data rate may be of any one of 1 Mbps, 2 Mbps, 5.5 Mbps, and 11 Mbps at an individual frame, and here, it is assumed to be of 11 Mbps. A length of the data link layer frame 104 (see, FIG. 7) of the data frame 5 is arbitrary, and here, it is assumed to be 250 bytes.

Firstly, it is assumed that, at a time point t30, when the management terminal 1 transmits a beacon frame 63 which also shows that it has stored data addressed to the communication terminal 2a and the communication terminal 2b, respectively, the communication terminal 2a and the communication terminal 2b compete with each other in order to obtain a transmission right, and the communication terminal 2b loses the competition with the communication terminal 2a. At a time point t31, the communication terminal 2a, which won the competition, transmits a PS-Poll frame 64a which shows a data transmission request, to the management terminal 1, and the management terminal 1 receives the PS-Poll frame 64a.

On this occasion, the frame reception section 51 (see, FIG. 8) of the communication terminal 2b which lost the competition receives the PS-Poll frame 64 which was transmitted by the communication terminal 2a. When it receives the PS-Poll frame 64a, the frame content readout section 52 (see, FIG. 8) of the communication terminal 2b reads out a content which was stored in the PHY header 103 of the received PS-Poll frame 64a.

As a content stored in the PHY header 103 of the PS-Poll frame 64a, a data rate (11 Mbps) and transmission time (14.5 μs) of the data link layer frame 104 are shown. Therefore, the frame content readout section 52 can know transmission time of the data link layer frame 104.

Next, the power off time setup section 53 (see, FIG. 8) of the communication terminal 2b sets up remaining time of the PS-Poll frame 64a, i.e., transmission time of the data link layer frame 104, 14.5 μs (=20 bytes/11 Mbps) as power off time Toff.

When the power off time setup section 53 sets up the power off time Toff, the time judgment section 55 (see, FIG. 8) of the communication terminal 2b judges whether the calculated power off time Toff exceeded a threshold value Tth which shows predetermined time or not. When it judges that the power off time Toff exceeded the threshold value Tth, the power off section 53 (see, FIG. 8) of the communication terminal 2b turns off power during a period of the power off time Toff. On the one hand, when it judges that the power off time does not exceed the threshold value Tth, the power off section 53 maintains power on. Meanwhile, the threshold value Tth is arbitrary, and here, it is set as 100 82 s.

The power off time Toff is 14.5 μs as described above, and therefore, a magnitude relation of the threshold value Tth and the power off time Toff becomes 100 μs>14.5 μs, and the time judgment section 55 judges that the power off time Toff does not exceed the threshold value Tth. Therefore, the power off section 53 maintains power on, and therefore, the communication terminal 2b continues to be awake.

In this manner, when the management terminal 1 receives the PS-Poll frame 64a, the management terminal 1 transmits the data frame 65a to the communication terminal 2a at a time point t32. On this occasion, the frame reception section 51 of the communication terminal 2b receives the data frame 65a which was transmitted by the management terminal 1, in the same manner as the case in which it received the PS-Poll frame 64a. When it receives the data frame 65a, the frame content readout section 52 of the communication terminal 2b reads out a content which was stored in the PHY header 103 of the received data frame 65a. That is, the frame content readout section 52 reads out a data rate (11 Mbps) and transmission time (181.8 μs) of the data link layer frame 104, which are contents stored in the PHY header 103 of the data frame 65a.

The power off setup section 53 of the communication terminal 2b sets up remaining time of the data frame 65a, i.e., the transmission time of the data link layer frame 104, 101.8 μs (=250 bytes/11 Mbps), as the power off time Toff.

Figure 26:
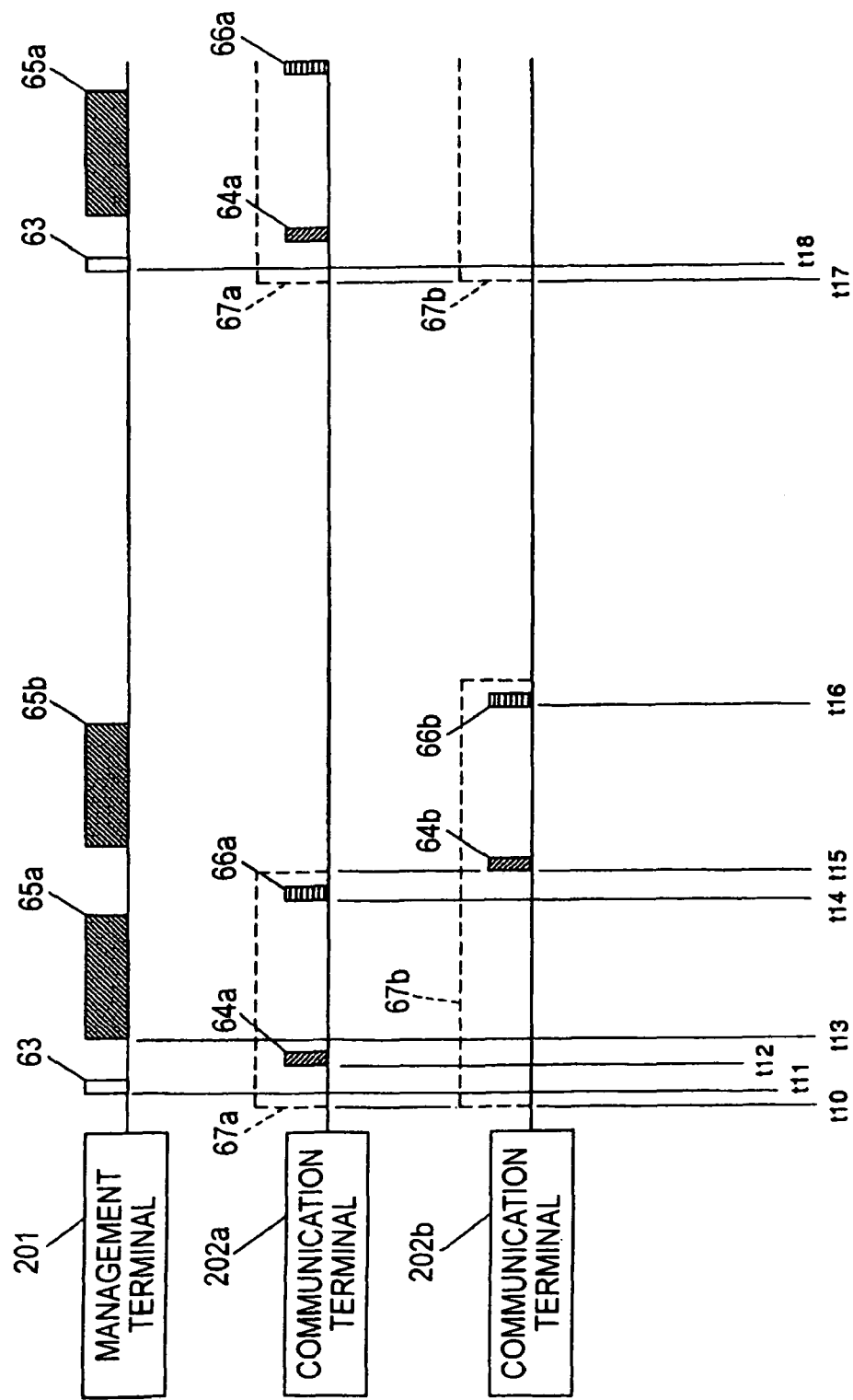
FIG. 26 is a time chart which shows an operation of the communication system in the related art.

In this case, a magnitude relation of the threshold value Tth and the power off time Toff becomes 100 μs<181.8 μs, and therefore, the time judgment section 55 of the communication terminal 2b judges that the power off time Toff exceeded the threshold value Tth. Therefore, the power off section 54 of the communication terminal 2b turns off power during a period of the power off time Toff (181.8 μs). That is, the communication terminal 2b is to turn off power, during a period from a time point t33 until a time point t34 (transmission completion of the data frame 65a). By this means, it is possible to shorten time for turning On power by only the power off time Toff shown in FIG. 9, among the power on time 67b (broken line) explained in FIG. 26.

Hereinafter, in the same manner, assuming that the communication terminal 2b lost the competition with the communication terminal 2a, the communication terminal 2b is to turn off power, during a period of the power off time Toff, in the same manner after a next beacon frame 63, at a time point t36, as shown on a right side of FIG. 9. In addition, even in case that the communication terminal 2a lost the competition with the communication terminal 2b, it is to turn off power during a period of the power off time Toff, in the same manner.

Here, power on time Ton, which is essentially necessary for the communication terminal 2b, is calculated, and hereinafter, such a percentage that power consumption was suppressed is shown.

Unnecessary power on time Ton is one from the PS-Poll frame 64a (time point t31) of the communication terminal 2a until transmission completion of the ACK frame 66a of the communication terminal 2a (time point t35). Meanwhile, the ACK frame 66a is of a fixed length, and a length of its data link layer frame 104 is 14 bytes, and therefore, transmission time of the data link layer frame 104 is 10.2 μs (=14 bytes/11 Mbps).

Therefore, a concrete value of the power on time Ton becomes (PS-Poll frame 64a)+SIFS+(data frame 65a)+ SIFS+(ACK frame 66a)=(192+14.5)+10+(192+181.8)+10+ (192+10.2)=802.5 μs.

On the one hand, the power off time Toff is 181.8 μs as already described above. That is, such a percentage that power consumption was suppressed is 22.6% from Toff/Ton=181.8/802.5=0.226.

As above, in the communication system 100 which relates to the embodiment 1, power off time Toff of a communication terminal is calculated depending on a content of a frame which is transmitted/received between another communication terminal and a management terminal, and therefore, it is possible to turn off power of the communication terminals 2a, 2b during a period of not carrying out transmission/reception to/from the management terminal 1, and it is possible to suppress power consumption of the communication terminals 2a, 2b.

By this means, it is possible to further suppress power consumption, to an application which handles large data in one frame. In addition, in case that a communication terminal carries out a voice call, it is possible to lengthen call time by much of suppressed power consumption. In particular, the invention is suitable for such a case that a communication terminal is of cordless (a battery is used as electric power), on the occasion when a management terminal transmits/receives a frame to/from a communication terminal wirelessly.

In addition, in case that the power off time Toff is long to some extent, it is possible to turn off power of the communication terminals 2a, 2b, and therefore, it is possible to not excessively repeat on/off of power. Meanwhile, this embodiment described such a case that power of a communication terminal is turned off in case that it is judged that the power off time Toff exceeded the threshold value Tth, but there is necessarily no need to limit to this. For example, it is also possible to turn off power of a communication terminal, every power off time which corresponds to respective frames (PS-Poll frame 64a, data frame 65a, . . . ), without carrying out the above-described judgment processing.

In addition, this embodiment 1 described a case of two communication terminals, but it is needless to say that the number of communication terminals may be more than two, and arbitrary.

In addition, this embodiment 1 described such a case that the invention was applied to a communication method based on IEEE802.11b, but there is particularly no need to limit to this, and it is also possible to apply the invention to IEEE802.11a, IEEE802.11g, IEEE802.11e (described later). For example, explaining about IEEE802.11a, transmission time of a data link layer frame is not stored in a PHY header in IEEE802.11a, but information of a data rate and a length (byte number) of a data link layer frame is stored therein, and therefore, by calculating the power off time Toff on the basis of these information, it is possible to turn off power of a communication terminal in the same manner as that described above.

Embodiment 2

A communication system 100, which relates to an embodiment 2 of the invention, will be described.

Figure 10:
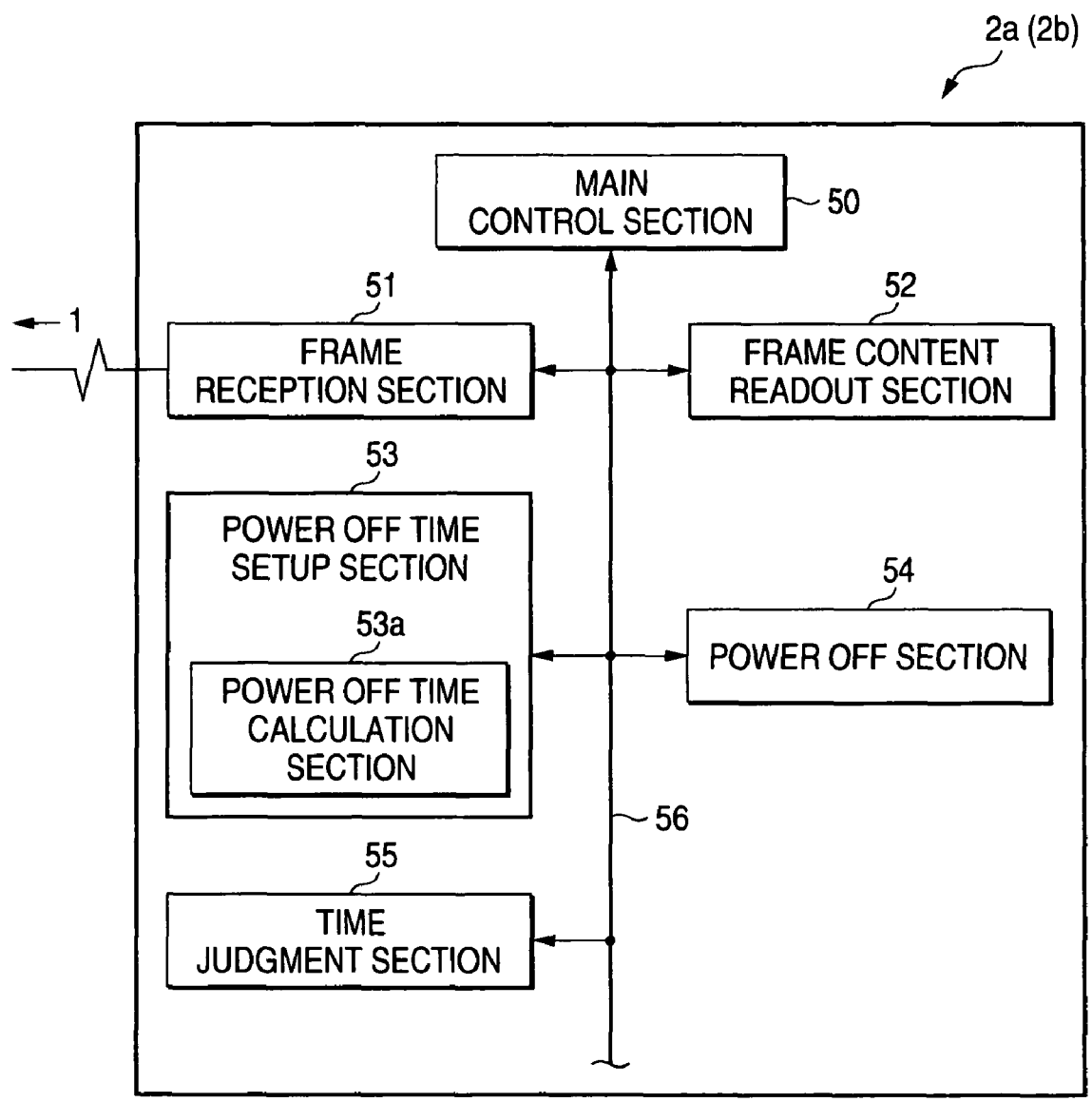
FIG. 10 is a functional block diagram of a communication terminal in an embodiment 2 of the invention.

FIG. 10 is a functional block diagram of a communication terminal in the embodiment 2 of the invention.

Communication terminals 2a, 2b of this communication system 100 are different from those in the embodiment 1, and has a power off time setup section 53 and a power off time calculation section 53a as shown in FIG. 10. Meanwhile, another configuration is the same as that in the embodiment 1, and therefore, its explanation will be omitted.

In this configuration, an operation of the communication system 100 in the embodiment 2 will be hereinafter described.

Figure 11:
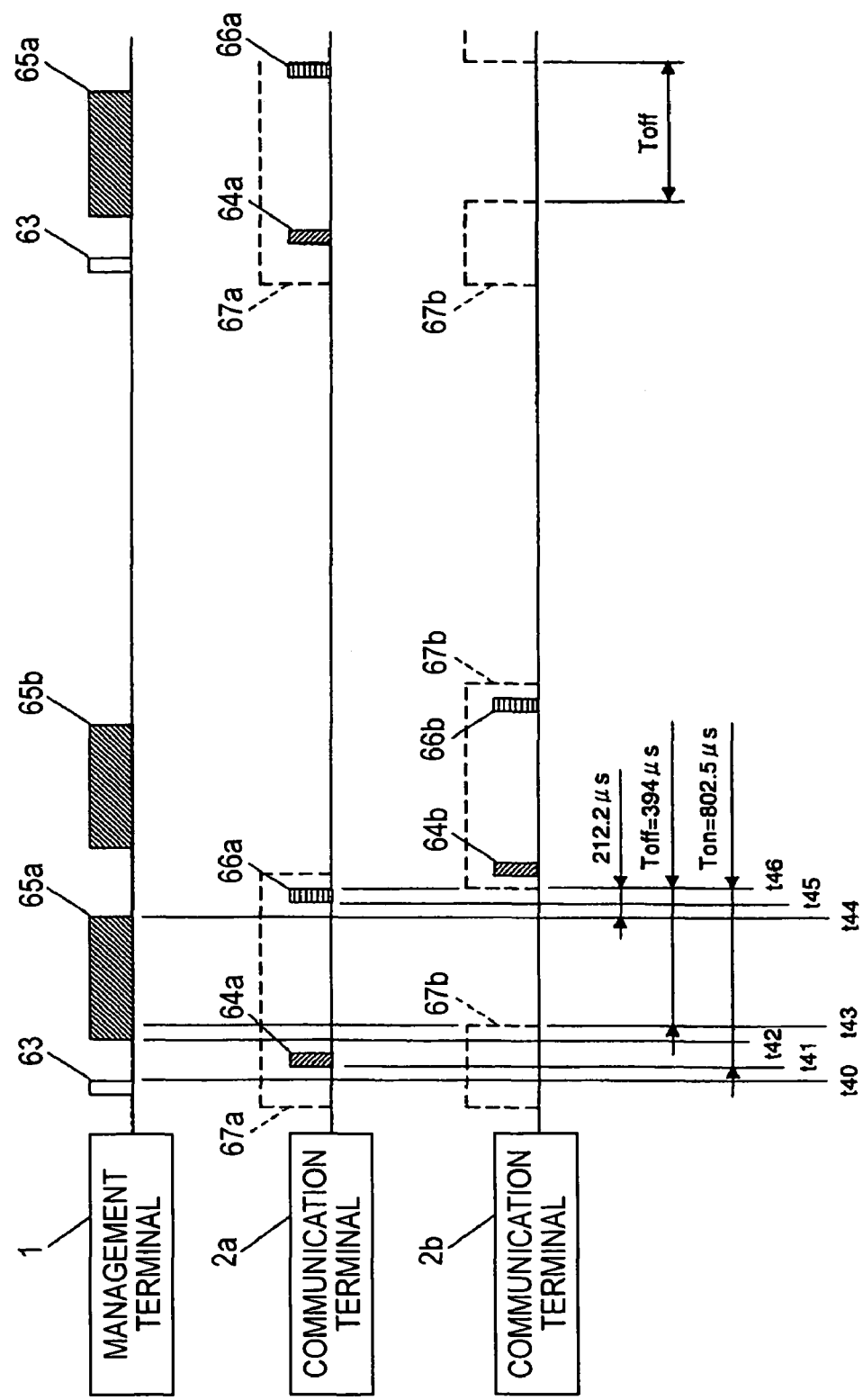
FIG. 11 is a time chart which shows an operation of the communication system in the embodiment 2 of the invention.

FIG. 11 is a time chart which shows an operation of the communication system 100 in the embodiment 2 of the invention.

In FIG. 11, basic operations of a management terminal 1 and the communication terminal 2a are the same as those in the related technology which were already described. In the embodiment 2, all frames meet the standard of 802.11b, in the same manner as in the embodiment 1, and it is assumed that SIFS is of 10 μs, and a PHY header 103 is of 192 μs, and a data rate is 11 Mbps, and a length of a data link layer frame 104 of a data frame 65 is 250 bytes.

Firstly, an operation at a time point t40 through a time point t41 is the same as the operation at the time point t30 through the time point t31 of FIG. 9 which was described in the embodiment 1, and therefore, its explanation will be omitted. A frame reception section 21 of the communication terminal 2b which lost competition receives a PS-Poll frame 64a which was transmitted by the communication terminal 2a, at the time point t41.

On this occasion, a frame content readout section 52 of the communication terminal 2b reads out a content which was stored in the received PS-Poll frame 64a. Here, the PS-Poll frame 64a shows such a frame sequence that a plurality of frames continue in terms of time, by such a matter that they are transmitted/received between the management terminal 1 and the communication terminal 2a.

Concretely speaking, this frame sequence is such a matter that the management terminal 1 transmit, at a time point t43 after the PS-Poll frame 64a, the data frame 65a in which a length of a data link layer frame 104 is 250 bytes, and further, transmits, at a time point t45 after SIFS, an ACK frame 66a which shows that the communication terminal 2a received it (65a) and in which a length of a data link layer frame 104 is 14 bytes.

The frame content readout section 52 reads out this frame sequence, from the received PS-Poll frame 64a.

Meanwhile, in this case, power off time Toff (14.5 μs), which was calculated by the received PS-Poll frame 64a, does not exceed a threshold value Tth (100 μs), and therefore, a power off section 53 of the communication terminal 2b does not turn off power, and therefore, the communication terminal 2b continues to be awake.

In this manner, when the management terminal 1 receives the PS-Poll frame 64a, the management terminal 1 transmits, at the time point t42, the data frame 65a to the communication terminal 2a. On this occasion, a frame reception section 51 of the communication terminal 2b receives the data frame 65a which was transmitted by the management terminal 1, in the same manner as in the embodiment 1.

The frame content readout section 52 of the communication terminal 2b reads out a content which was stored in a PHY header 103 (see, FIG. 7) of the received data frame 65a. That is, the frame content readout section 52 reads out a data rate (11 Mbps) and transmission time (181.8 μs) of the data link layer frame 104, which are contents stored in the PHY header 103 of the data frame 65a.

Further, the communication terminal 2b knows that an ACK frame 66 continues in terms of time after the data from 65a, by reading out the frame sequence, and therefore, the power off calculation section 53a of the communication terminal 2b adds transmission time of SIFS+ACK frame 66, to the transmission time of the data link layer frame 104, 181.8 μs, as power off time Toff.

Since the transmission time of the ACK frame 66 is 10.2 μs (=14 bytes/11 Mbps), the power off time setup section 53 sets up 394 μs, which was obtained by adding 212.2 μs (=192 μs+10.2 μs) to 181.8 μs, as the power off time Toff.

In this manner, when the power off time Toff is set up, a magnitude relation of a threshold value Tth and the power off time Toff becomes 100 μs<394 μs, and therefore, a time judgment section 55 of the communication terminal 2b judges that the power off time Toff exceeded the threshold value Tth.

Therefore, a power off section 54 of the communication terminal 2 turns off power during a period of the power off time Toff (394 μs). That is, the communication terminal 2b is to turn off power, during a period from the time point t43 until the time point t46 (transmission completion of the ACK frame 66). By this means, the power off time Toff (181.8 μs), which was explained in the embodiment, is further lengthened, and thereby, it is possible to further shorten time for turning on power.

Here, power on time Ton, which is essentially necessary for the communication terminal 2b, is calculated, and hereinafter, such a percentage that power consumption was suppressed is shown.

Unnecessary power on time Ton is 802.5 μs, which is the same as the value calculated in the embodiment 1. That is, such a percentage that power consumption was suppressed becomes 49.1% from Toff/Ton=394/802.5=0.491, and it is possible to heighten such a percentage that power consumption was suppressed, more than that in the embodiment 1.

As above, in the communication system 100 which relates to the embodiment 2, a frame sequence is read out, and power of the communication terminals 2a, 2b is turned off, during a period of transmission time of the frame sequence which was read out, and thereby, it is possible to turn off power, across a plurality of frames which continue in terms of time. By this means, it is possible to lengthen the power off time Toff as much as possible, and it is possible to not excessively repeat on/off of power. Therefore, it is possible to further suppress power consumption of the communication terminals 2a, 2b.

Meanwhile, this embodiment 2 described the case of two communication terminals, but it is needless to say that the number of communication terminals may be arbitrary.

In addition, this embodiment 2 described such a case that the invention was applied to a communication method based on IEEE802.11b, but in the same manner as in the embodiment 1, there is particularly no need to limit to this, and it is also possible to apply the invention to IEEE802.11a, IEEE802.11g, IEEE802.11e (described later).

Embodiment 3

A communication system 100, which relates to an embodiment 3 of the invention, will be described.

Communication terminals 2a, 2b of this communication system 100 are of the same configurations as in the embodiment 2 shown in FIG. 10, and a power off time setup section 53 has a power off time calculation section 53a. Meanwhile, another configuration is the same, and therefore, its explanation will be omitted.

In this configuration, an operation of the communication system 100 in the embodiment 3 will be hereinafter described.

Figure 12:
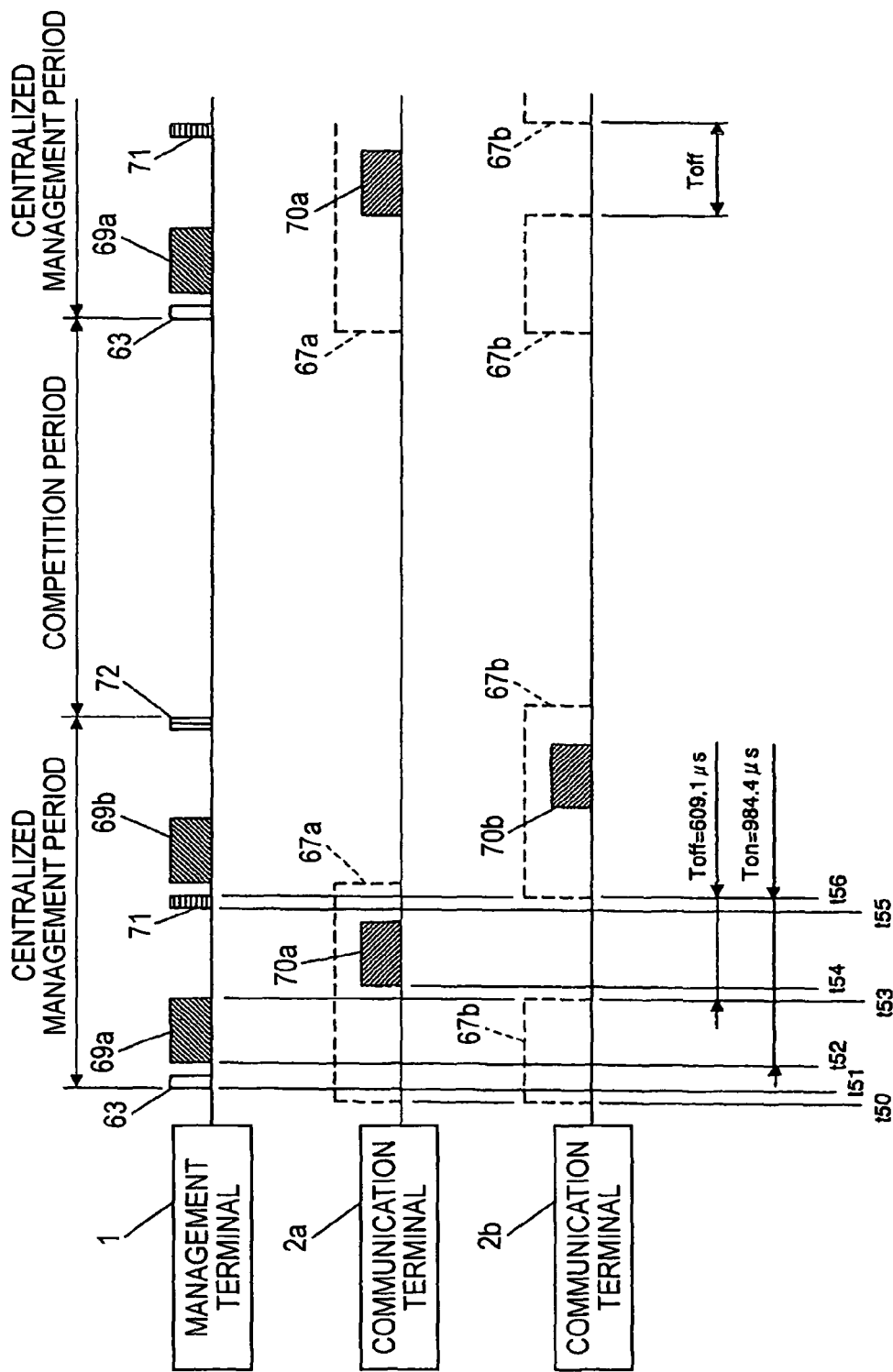
FIG. 12 is a time chart which shows an operation of a communication system in an embodiment 3 of the invention.

FIG. 12 is a time chart which shows an operation of the communication system 100 in the embodiment 3 of the invention.

In FIG. 12, basic operations of a management terminal 1 and the communication terminal 2a are the same as those in the related technology which were already described. The embodiment 3 assumes a voice call. Concretely speaking, voice data is transmitted by QoS data+a CF-Poll frame 69a, and QoS data+CF-Ack frame 70a, respectively. In this voice data, G.711 of 20 ms codec is adopted as a sample rate, and a length of its data link layer frame 104 is 252 bytes.

In addition, all frames meet standards of 802.11b and 802.11e. Concretely speaking, in the same manner as in the embodiments 1, 2, it is assumed that SIFS is of 10 μs, and a PHY header 103 is of 192 μs, and a data rate may be any one of 11 Mbps, 2 Mbps, 5.5 Mbps, and 11 Mbps, if it is the same in an individual frame sequence, and here, it is assumed that it is 11 Mbps in the same manner as in the embodiments 1, 2.

From one immediately after a beacon frame 63 at a time point t51, the communication terminal 2b does not know to which communication terminal a frame has been transmitted from the management terminal 1, and therefore, in order to ascertain a MAC header 105 in which a destination has been stored, a frame reception section 51 of the communication terminal 2b receives, at a time point t52, QoS data+CF-Poll frame 69a. At a time point t53, when it receives the QoS data+CF-Poll frame 69a till the last (till FCS), the communication terminal 2b knows that it is not addressed to itself.

A frame content readout section 52 of the communication terminal 2b reads out such a matter that it is voice data, and a frame sequence which is transmitted/received between the management terminal 1 and the communication terminal 2a, from this QoS data+CF-Poll frame 69a.

Concretely speaking, at a time point t54 after SIFS, it is read out that the communication terminal 2a transmits QoS data+CF-Ack frame 70a in which a data rate is 11 Mbps and a length of a data link layer frame 104 is 252 bytes, and further, at a time point t55 after SIFS, it is read out that the management terminal 1 transmits QoS CF-Ack frame which shows that it received it (70a) and in which a length of a data link layer frame 104 is 300 bytes of a fixed length.

The power off calculation section 53a of the communication terminal 2b, when it reads out the frame sequence, calculates power off time on the basis of the data rate and the frame sequence.

That is, transmission time of the QoS data+CF-Ack frame 70a is 192+183.3 (=252 bytes/11 Mbps). In addition, transmission time of the QoS CF-Ack frame 71 is 192+21.8 (=30 bytes/11 Mbps). Therefore, the power off calculation section 53a calculates transmission time of a remaining frame sequence, which is (SIFS)+(QoS data+CF-Ack frame 70a)+

(SIFS)+(QoS CF-Ack frame 71)=10+(192+183.3)+10+(192+21.8)=609.1 µs, and the power off time setup section 53 sets up the calculated transmission time as the power off time Toff.

Figure 27:
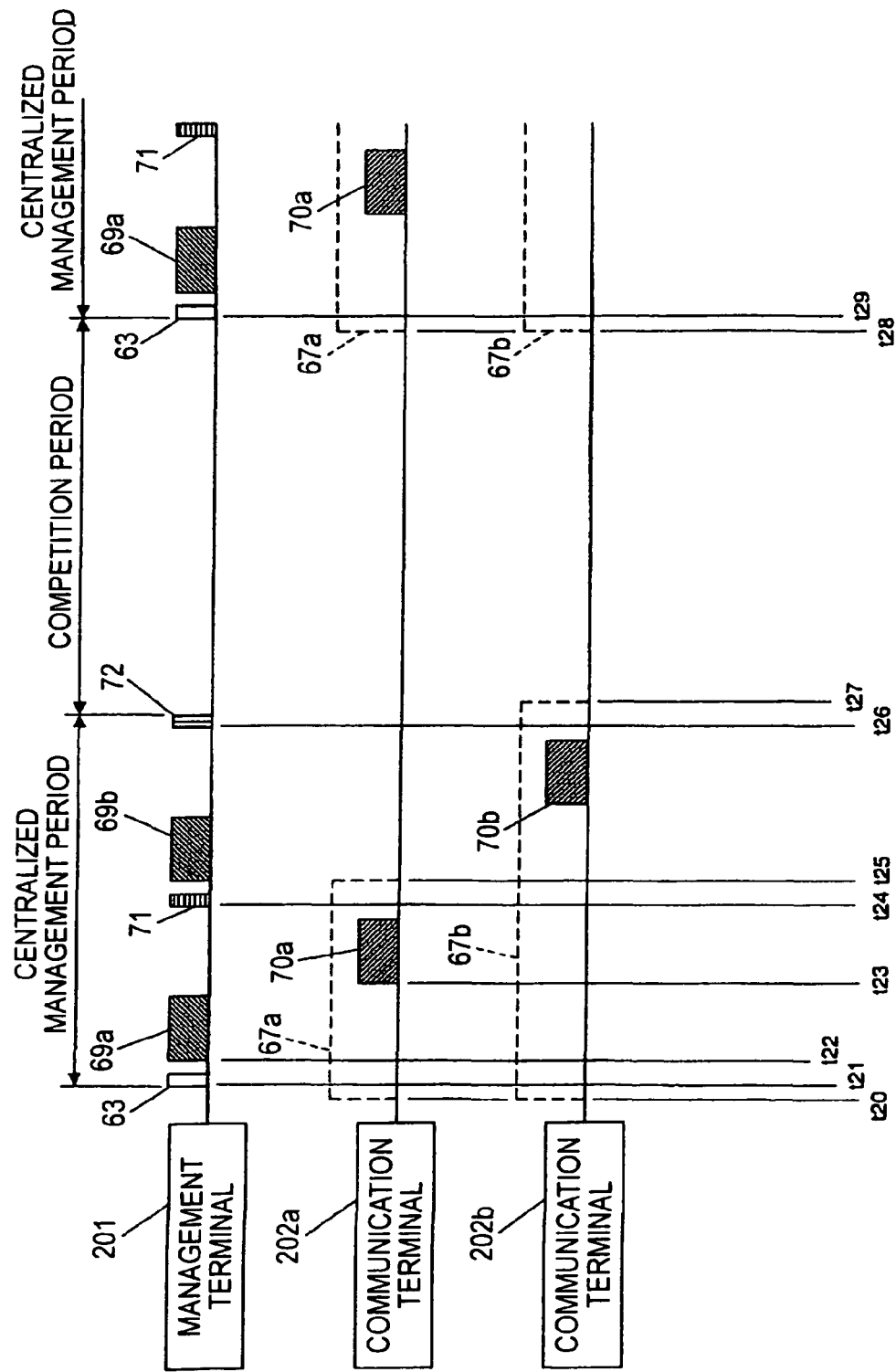
FIG. 27 is a time chart which shows an operation of the communication system in the related art.

When the power off time Toff is set to 609.1 µs, a magnitude relation of a threshold value Tth and the power off time Toff becomes 100 µs<609.1 µs, and therefore, a time judgment section 55 of the communication terminal 2b judges that the power off time Toff has exceeded the threshold value Tth. Therefore, a power off section 54 of the communication terminal 2b turns off power, during a period of the power off time (609.1 µs). That is, the communication terminal 2b is to turn off power, during a period from the time point t53 until the time point t56 (transmission completion of the QoS CF-Ack frame 71). In sum, it is possible to shorten time for turning on power, by just much of the power off time Toff shown in FIG. 12, among the power on time 67b (broken line) which was explained in FIG. 27.

Here, power on time Ton, which is essentially necessary for the communication terminal 2b, is calculated, and hereinafter, such a percentage that power consumption was suppressed is shown.

Unnecessary power on time Ton is one from start of the QoS data+CF-Poll frame 69a (time point t52) until transmission completion of the QoS CF-Ack frame 71 (time point t56). Meanwhile, transmission time of the QoS data+CF-Poll frame 69a is 192+183.3=375.3 µs.

Therefore, a concrete value of the unnecessary power on time Ton becomes 984.4 µs by adding 375.3 µs to the power off time Toff (609.1 µs). On the one hand, power off time Toff is 609.1 µs, as already described above. That is, such a percentage that power consumption was suppressed is 61.9% from Toff/Ton=609.1/984.4=0.619.

Here, in case that 10 units of communication terminals which transfer voice data (hereinafter, referred to as "voice terminals") are calling at one time, a ratio of power consumption of voice terminals which are processed in a first place and a tenth place is tried to be calculated. In a related technology, a voice terminal, which is processed in a tenth place, continues to be awake, and therefore, comparing to a voice terminal in a first place, it is to consume electric power ten times more. In this embodiment, power consumption of 61.9% of that at the time of carrying out processing to voice terminals from a first place one until a ninth place one is reduced to the voice terminal which is processed in a tenth place, and therefore, it means that power consumption of 9×(1−0.619)+1≅4.43 times is sufficient, and as call time, it becomes 2.26 times as compared to a related technology.

As above, in the communication system 100 which relates to the embodiment 3, it reads out things from a frame till FCS, in order to calculate the power off time Toff, and it is possible to confirm reasonableness of contents of a header and a frame body, and it is possible to surely calculate the power off time Toff.

In addition, even in case that the communication system is configured by a number of voice terminals, it is possible to obtain such a favorable advantage that it is possible to lengthen call time, to a voice terminal other than a voice terminal which is processed at the beginning, from a beacon frame.

Meanwhile, this embodiment 3 described the case of two communication terminals, but it is needless to say that the number of communication terminals may be more than 2 and arbitrary. In addition, it described a case of voice data, but it is needless to say that it is also applicable to such a case that another frame sequence is understood.

Embodiment 4

A communication system 100, which relates to an embodiment 4 of the invention, will be described.

Communication terminals 2a, 2b of this communication system 100 are of the same configurations as in the embodiment 2 shown in FIG. 10, and a power off time setup section 53 has a power off time calculation section 53a. Meanwhile, another configuration is the same, and therefore, its explanation will be omitted.

In this configuration, an operation of the communication system 100 in the embodiment 4 will be hereinafter described.

Figure 13:
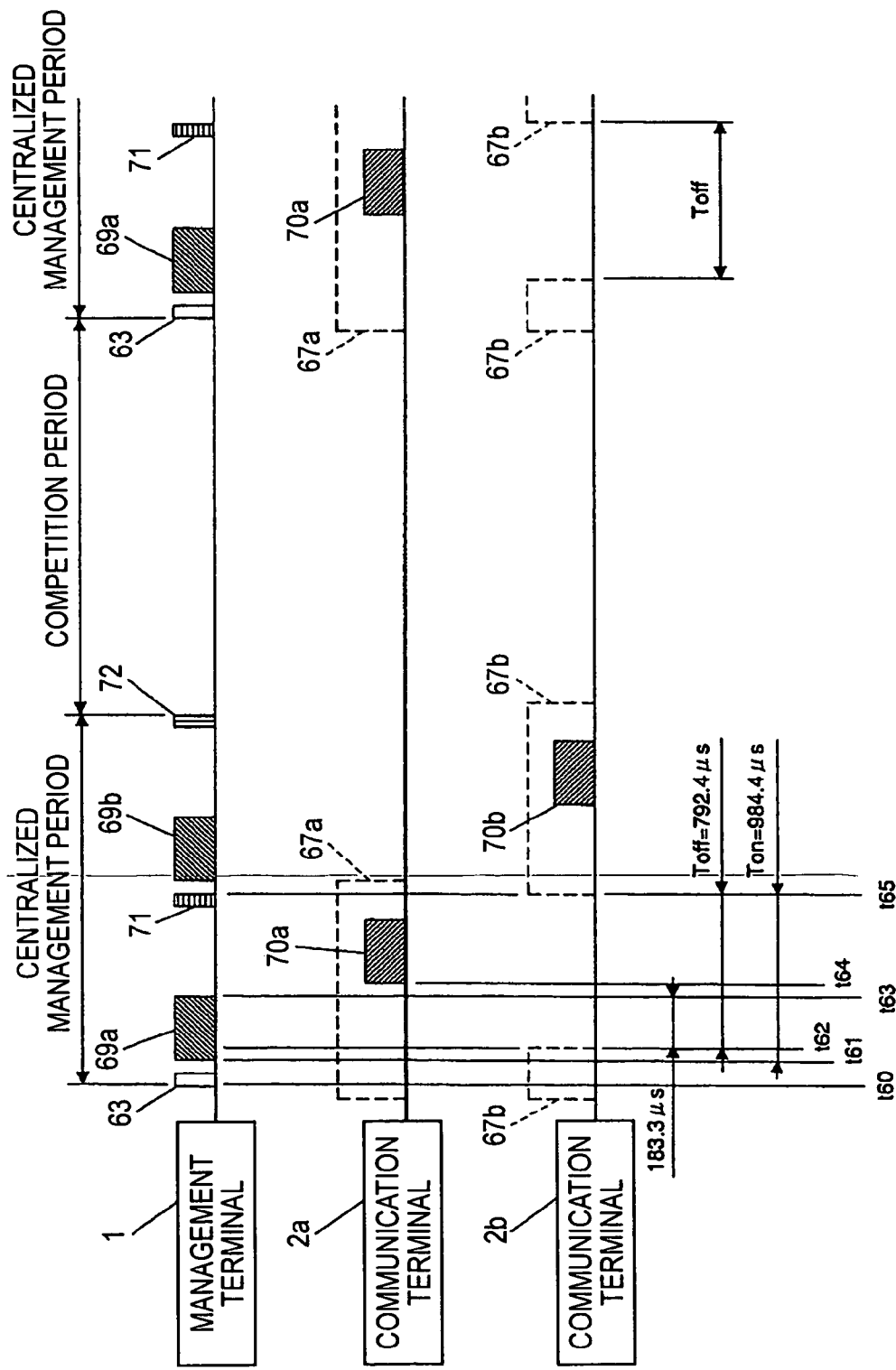
FIG. 13 is a time chart which shows an operation of a communication system in an embodiment 4 of the invention.

FIG. 13 is a time chart which shows an operation of the communication system 100 in the embodiment 4 of the invention.

In FIG. 13, basic operations of a management terminal 1 and the communication terminal 2a are the same as those in the related technology which were already described. In this embodiment 4, G.711 of codec in which a sample rate is 20 ms is adopted in the same manner as in the embodiment 3, and a length of a data link layer farme 104, in a QoS data+CF-Poll frame 69a and a QoS data+CF-Ack frame 70a, is 252 bytes. In addition, all frames meet the standards of 802.11b and 802.11e, and it is assumed that SIFS is of 10 82 s and a PHY header 103 is of 192 µs and a data rate is 11 Mbps.

Meanwhile, here, the management terminal 1 notifies to the communication terminals 2a, 2b, such a matter that it processes a frame sequence of voice data (QoS data+CF-Poll frame 69a+SIFS+QoS data+CF-Ack frame 70a+SIFS+QoS CF-Ack frame 71) immediately after a beacon frame 63, and respective byte numbers, in advance. In this regard, however, as to a length of a data link layer frame 104 of the QoS CF-Ack frame 71, there is no need for the management terminal to notify it, and it is a fixed length which is determined in the standard, and is 30 bytes.

At a time point t60, the management terminal 1 transmits a beacon frame 63 which also shows that a communication order of transmitting/receiving to/from the management terminal 1 is an order of the communication terminal 2a→the communication terminal 2b, and the communication terminal 2b knows, when it received the beacon frame 63, that a frame sequence addressed to itself is not started.

The communication terminal 2b does not know codec and a data rate which are used in a frame sequence that is not addressed to itself, and therefore, a frame reception section 51 of the communication terminal 2b receives a QoS data+CF-Poll frame 69a, which is a first frame in the frame sequence. A frame content readout section 52 of the communication terminal 2b reads out a data rate (11 Mbps) and transmission time (183.3 µs) of a data link layer frame 104 which are contens stored in a PHY header 103 of the received QoS data+CF-Poll frame 69a. QoS data+CF-Poll frame 69a and QoS data+CF-Ack frame 70a use the same codec, and therefore, the communication terminal 2b know that the number of bytes of a data link layer frame 104 of the QoS data+CF-Ack frame 70a is 252 bytes.

The power off time calculation section 53a of the communication terminal 2b, when it reads out the data rate, calculates transmission time of a frame sequence at a time point t62 through a time point t65, i.e., transmission time of (transmission time of the data link layer frame 104 of the QoS data+CR-Poll frame 69a)+(SIFS)+(QoS date+CF-Ack frame 70a)+(SIFS)+(QoS CF-Ack frame 71).

The transmission time of the data link layer frame 104 of the QoS data+CF-Poll frame 69a is 183.3 µs (=252 bytes/11 Mbps), as described above. In addition, (SIFS)+(QoS data+

CF-Ack frame 70a)+(SIFS)+(QoS CF-Ack frame 71) is Toff (609.1 μs) which was calculated in the embodiment 3. Therefore, the power off time calculation section 53a adds 183.3 μs and 609.1 μs, and calculates transmission time of a frame sequence as 792.4 μs, and the power off time calculation section 53 sets up the calculated transmission time as power off time Toff.

When the power off time Toff is set up to 792.4 μs, a magnitude relation of a threshold value Tth and the power off time Toff becomes 100 μs<792.4 μs, and therefore, a time judgment section 55 of the communication terminal 2b judges that the power off time Toff has exceeded the threshold value Tth. Therefore, a power off section of the communication terminal 2b turns off power, during a period of the power off time Toff (792.4 μs). That is, the communication terminal 2b is to turn off power, during a period from a time point t62 till a time point t65. By this means, it is possible to further shorten time for turning on power, by further lengthening the power off time Toff (609.1 μs) which was explained in the embodiment 3 (FIG. 12).

Here, power on time Ton, which is essentially necessary for the communication terminal 2b, is calculated, and hereinafter, such a percentage that power consumption was suppressed is shown.

Unnecessary power on time Ton is 984.4 μs, which is the same as the value which was calculated in the embodiment 3. That is such a percentage that power consumption was suppressed becomes 80.5% from Toff/Ton=792.4/984.4=0.805, and it is possible to heighten such a percentage that power consumption was suppressed, more than that in the embodiment 3.

Here, in case that 10 units of voice terminals are calling at one time, a ratio of power consumption of voice terminals which are processed in a first place and a tenth place is tried to be calculated. In a related technology, a voice terminal, which is processed in a tenth place, continues to be awake, and therefore, comparing to a voice terminal in a first place, it is to consume electric power ten times more. In this embodiment, power consumption of 80.5% of that at the time of carrying out processing to voice terminals from a first place one until a ninth place one is reduced, and therefore, it means that power consumption of $9 \times (1-0.805)+1 \cong 2.76$ times is sufficient, and as call time, it becomes 3.62 times more as compared to a related technology.

As above, in the communication system which relates to the embodiment 4, a frame sequence is read out only by a beacon frame, and therefore, it is possible to calculate power off time Toff which corresponds to a frame sequence which follows after the beacon frame, at an early stage. By this means, it is possible to further lengthen the power off time Toff, and therefore, it is possible to further suppress power consumption of the communication terminals 2a, 2b.

Meanwhile, in this embodiment 4, it is needless to say that it is also applicable to such a case that another frame sequence is understood. In addition, it described a case of reading out the number of bytes of voice data and a data rate, from a physical header of the QoS data+CF-Poll frame 69a, but it is configured in such a manner that all terminals in the communication system use the same codec to thereby realize the same number of bytes, it is needless to say that it is possible to calculate power off time Toff, simply by reading out only a data rate.

Meanwhile, this embodiment 4 described the case of two communication terminals, but the number of communication terminals may be arbitrary.

Embodiment 5

A communication system 100, which relates to an embodiment 5 of the invention, will be described.

Communication terminals 2a, 2b of this communication system 100 are of the same configurations as in the embodiment 2 shown in FIG. 10, and a power off time setup section 53 has a power off time calculation section 53a. Meanwhile, another configuration is the same, and therefore, its explanation will be omitted.

In this configuration, an operation of the communication system 100 in the embodiment 5 will be hereinafter described.

Figure 14:
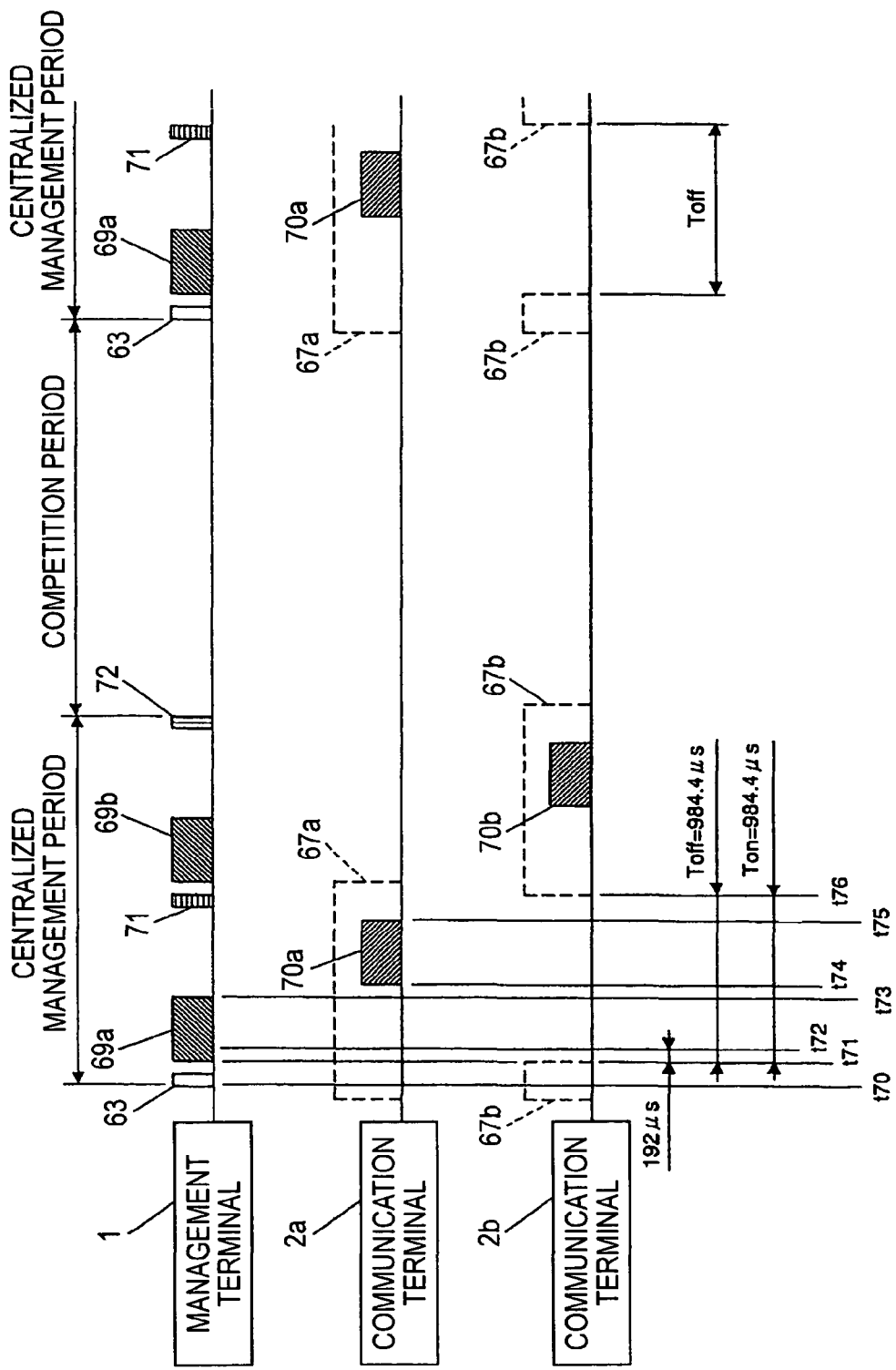
FIG. 14 is a time chart which shows an operation of a communication system in an embodiment 5 of the invention.

FIG. 14 is a time chart which shows an operation of the communication system 100 in the embodiment 5 of the invention.

In FIG. 14, basic operations of a management terminal 1 and the communication terminal 2a are the same as those in the related technology which were already described. In this embodiment 5, G.711 of codec in which a sample rate is 20 ms is adopted in the same manner as in the embodiment 3, and a length of a data link layer frame 104, in a QoS data+CF-Poll frame 69a and a QoS data+CF-Ack frame 70a, is 252 bytes. In addition, all frames meet the standards of 802.11b and 802.11e, and it is assumed that SIFS is of 10 μs and a PHY header 103 is of 192 μs and a data rate is 11 Mbps. It is assumed that information of this data rate is stored in the communication terminals 2a, 2b (i.e., the communication terminals 2a, 2b know the data rate).

Meanwhile, here, the management terminal 1 notifies to the communication terminals 2a, 2b, such a matter that it processes a frame sequence of voice data (QoS data+CF-Poll frame 69a+SIFS+QoS data+CF-Ack frame 70a+SIFS+QoS CF-Ack frame 71) immediately after a beacon frame 63.

Such a case that this management terminal 1 notifies a processing order will be described in detail.

Figure 15:
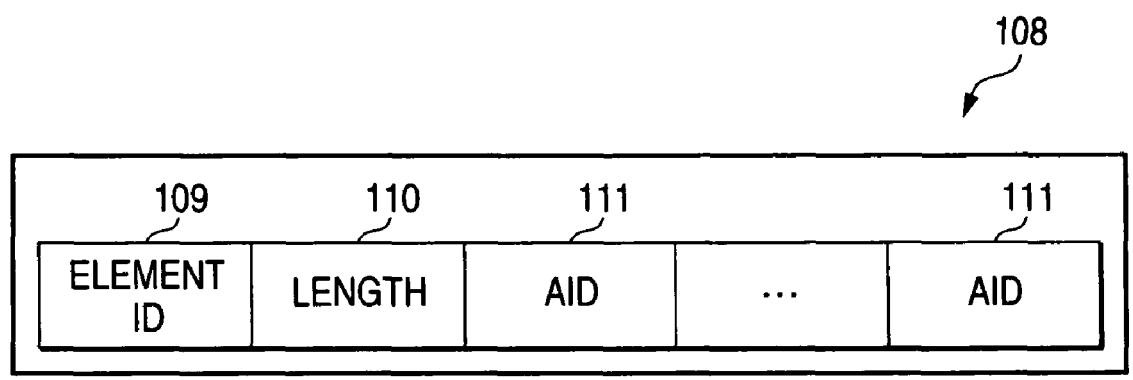
FIG. 15 is a view which shows information for notifying a processing order of a communication terminal in the embodiment 5 of the invention.

FIG. 15 shows information for notifying a processing order of the communication terminals 2a, 2b, and a TURN Indication element 108 is an odd number byte which is 3 or more, and is configured by Element ID 109, Length 110, and a plurality of AID 111.

The Element ID 109 is one byte which specifies what is represented by information which comes next to this, and for example, a value of 255. The Length 110 is one byte which specifies what byte information there is after this, and a value of an even number which is 2 or more. The AID 111 is a value from 1 through 2007, which is allocated at the time that management of the communication terminals 2a, 2b is started by the management terminal 1, and is 2 bytes. The Length 110 is one byte, and therefore, can determine a processing order of maximum 128 units of communication terminals.

The management terminal 1 adds the Indication element 111 in the frame body 106 of the beacon frame 63, or converts the MAC header 105 into a certain defined proper value, and broadcasts TURN Indication frame in which the frame body 106 itself is TURN Indication element 108, and thereby, it can also notify a processing order to each communication terminal.

In this embodiment, a case of adding the TURN Indication element 108 to the beacon frame 63 will be described.

Meanwhile, the TURN Indication element 108, which was described here, is not limited to this, and it is needless to say that, if information with a similar configuration is determined, any byte number and content are applicable. For example, if information of time which is allocated to each communication terminal is notified, a communication terminal can know power off time, without calculating the power off time. In addition, as to a processing order of communication terminals, there is necessarily no need to notify one for all communication terminals, and it is also all right even if processing of remaining communication terminals is carried out in an arbitrary order, after processing of communication terminals for which a processing order was notified was completed.

Meanwhile, this embodiment shows such a case that the management terminal 1 notifies a processing order etc. of the communication terminals 2a, 2b, during a centralized management period in which the management 1 manages the communication terminals 2a, 2b, but even in case of notifying a processing order etc. of the communication terminals 2a, 2b from the management terminal 1 during a competition period, the same advantage can be realized.

Returning to FIG. 14, at a time point t70, the management terminal 1 transmits a beacon frame 63 which also shows that a communication order of transmitting/receiving to/from the management terminal 1 is an order of the communication terminal 2a→the communication terminal 2b, and a frame reception section 51 of the communication terminal 2b receives the transmitted beacon frame 63. A frame content readout section 52 of the communication terminal 2b, when it receives the beacon frame 63, reads out a content of the beacon frame 63. The beacon frame 63 shows that a frame sequence addressed to the communication terminal 2b is not started at a time point t71, and when the frame sequence addressed to the communication terminal 2b is started.

Therefore, the communication terminal 2b knows that a frame sequence addressed to itself is not started, and when the frame sequence, which was already described, is started, by reading out a content of the beacon frame 63. In addition, the communication terminal 2b knows a data rate (11 Mbps) as already described above, and therefore, the power off calculation section 53a of the communication terminal 2b calculates transmission time of the frame sequence, on the basis of the data rate which it has already known, and the frame sequence which was already notified.

The frame sequence is, as described above, (QoS data+CF-Poll frame 69a+SIFS+QoS data+CF-Ack frame 70a+SIFS+QoS CF-Ack frame 71) at a time point t71 through a time point t76.

Therefore, the power off time calculation section 53a calculates transmission time of the frame sequence, i.e., transmission time of (QoS data+CF-Poll frame 69a+SIFS+QoS data+CF-Ack frame 70a+SIFS+QoS CF-Ack frame 71).

The above-described transmission time is sum of transmission time (192 µs) of a PHY header 103 of the QoS data+CF-Poll frame 69a and the power off time (792.4 µs) which was explained in the embodiment 4 (FIG. 13), and therefore, the power off time calculation section 53a calculates transmission time of the frame sequence as 984.4 µs (=192+792.4), and the power off time setup section 53 sets up the calculated transmission time as power off time Toff.

When the power off time Toff is set up to 984.4 µs, a magnitude relation of a threshold value Tth and the power off time Toff becomes 100 µs<984.4 µs, and therefore, a time judgment section 55 of the communication terminal 2b judges that the power off time Toff has exceeded the threshold value Tth. Therefore, a power off section 54 of the communication terminal 2b turns off power, during a period of the power off time Toff (984.4 µs). That is, the communication terminal 2b is to turn off power, during a period from a time point t71 till a time point t76. By this means, the power off time (792.4 µs), which was explained in the embodiment 4 (FIG. 13), is lengthened more, and thereby, it is possible to further shorten time for turning on power.

This power off time Toff is the same as time from start of the QoS data+CF-Poll frame 69a till transmission completion of a QoS CF-Ack frame 71, which is power on time Ton unnecessary for the communication terminal 2b. Thus, Toff/Ton=984.4/984.4=1.000 is realized, and it means that it is possible to reduce power consumption of 100%.

Here, in case that 10 units of voice terminals are calling at one time, power consumption of voice terminals which are processed in a first place and a tenth place will be considered. In this embodiment, all power consumption at the time that processing to voice terminals from a first place one till a ninth place one is carried out is reduced, to a voice terminal which is processed in a tenth place, and therefore, power consumption of voice terminals in a first place and a tenth place is the same.

As above, in the communication system 100 which relates to this embodiment 5, even in case that the number of calling units of voice terminals increased in case that a communication terminal is a voice terminal, wasteful power consumption does not increase at all in any voice terminal, and therefore, it is possible to further lengthen a call time.

Meanwhile, this embodiment 5 described the case of two communication terminals, but the number of communication terminals is arbitrary. In addition, it described a case of voice data, but it is needless to say that it is applicable to such a case that another frame sequence is understood. In addition, it described that the frame sequence of the voice data is fixed to 11 Mbps, but it is needles to say that, if a management terminal notifies a data rate which is used in a frame sequence, to each communication terminal, by a beacon frame etc., any value is applicable to a data rate.

In addition, these embodiments 1 through 5 described such a case that the invention was applied to a communication method of a frame based on the standard of IEEE802.11, but if the invention is applied to a communication method for transmitting/receiving a frame between a management terminal and a plurality of communication terminals, through a second network such as wireless LAN, there is no need to limit it to the suchlike communication method based on the standard.

In addition, these embodiments 1 through 5 described about wireless LAN as one example of the second network, but if it is a network in which a management terminal transmits/receives a frame to/from a communication terminal through a wireless communication path, there is not such a necessity that the second network is necessarily wireless LAN.

Embodiment 6

A communication system, which relates to an embodiment 6, will be described.

Figure 16:
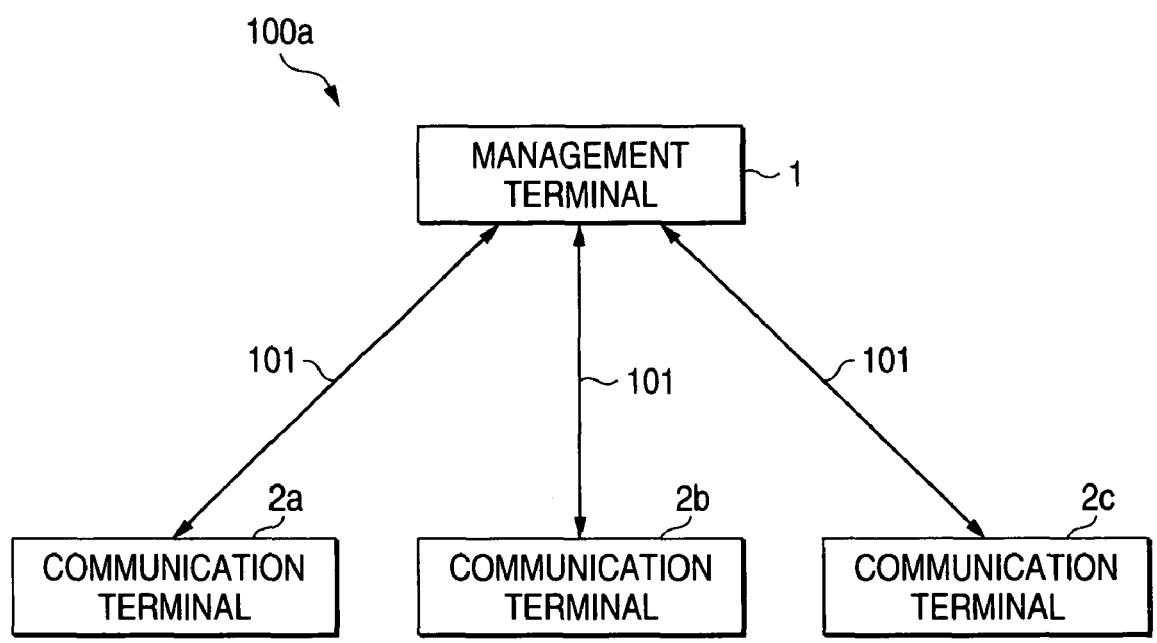
FIG. 16 is a block diagram of a communication system in an embodiment 6 of the invention.

FIG. 16 is a block diagram which shows a communication system which relates to the embodiment 6, and a communication system 10a in this embodiment in which 3 units of communication terminals (2a, 2b, 2c) exit to a management terminal 1 will be described.

Here, this embodiment will describe such a case that there are 3 units of communication terminals, and therefore, a related operation in the suchlike case will be described in the form of complementing the related technology which was shown previously.

FIG. 28 is a time chart in a related communication system, and shows an example of a communication system which is configured by a management terminal 201 and three units of communication terminals 202a, 202b, 202c.

In the time chart of FIG. 28, there are a centralized management period and a competition period. It shows such a case that the communication terminals 202a, 202b, 202c, which carry out control power on and power off on the basis of the IEEE802.11 standard, receive data from the management terminal 1 as in a voice call, and after that, data is transmitted to the management terminal 201. In FIG. 28, by using IEEE802.11e, QoS is secured, and voice data is transferred.

When the management terminal 201 wishes to transmit data to the communication terminals 202a, 202b, 202c, it is understood that, although the communication terminals 202a, 202b, 202c carry out control of power on and power off, the communication terminals 202a, 202b, 202 care in power on during the centralized management period. Therefore, it is possible to transmit a frame from the management terminal 201 at arbitrary timing. Inversely, when the communication terminals 202a, 202b, 202c wish to transmit data to the management terminal 201 during the centralized management period, it is not possible to transmit data unless the management terminal 201 permits it.

In addition, the management terminal 201, in case of terminating the centralized management period earlier than a period which was notified in a beacon frame 80, has to notify termination of the centralized management period to the communication terminals 202a, 202b, 202c.

Firstly, the management terminal 201 shows that there is data which is desired to be transmitted to the communication terminals 202a, 202b, 202c, and transmits the beacon frame 80. The communication terminals 202a, 202b, 202c are configured so as to receive all beacon frames 80. Therefore, each of them knows that there exist data addressed to itself in the management terminal 201, and it enters into the centralized management period.

During the centralized management period, as described above, the communication terminals 202a, 202b, 202c maintain a power on status. Then, the management terminal 201 transmits a QoS data+CF-Poll frame 81a which carries out transmission of data to the communication terminal 202a, and permission of data from the communication terminal 202a, at the same time, to the communication terminal 202a.

The communication terminal 202a, when it receives the QoS data+CF-Poll frame 81a in case that it is waiting for data addressed to the management terminal 201, transmits a QoS data+CF-Ack frame 82a which carries out to show that it received the QoS data+CF-Poll frame 81a during the centralized management period, and data transmission to the management terminal 201, at the same time, to the management terminal 201.

Figure 25:
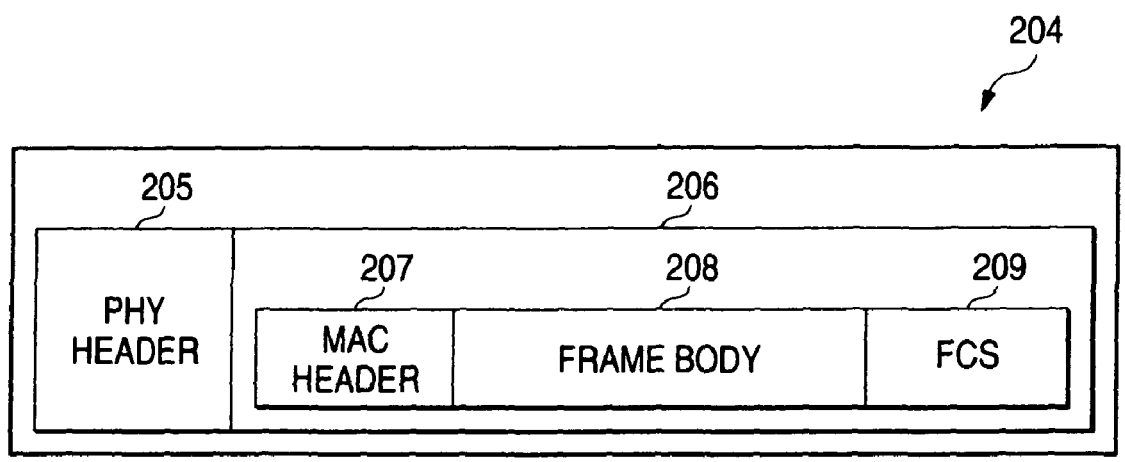
FIG. 25 is a block diagram of a physical layer frame of IEEE802.11 in the related art.

In a MAC header (see, FIG. 25) of this QoS data+CF-Ack frame 82a, it is possible to notify whether there is other data or not in the management terminal 1, from the communication terminal 2b, and in this related art, it notifies that there is no other data.

The management terminal 201, when it receives the QoS data+CF-Ack frame 82a, transmits a QoS CF-Ack frame 83 which shows that it received data from the communication terminal 202a during the centralized management period, to the communication terminal 202a.

The communication terminal 202a notifies to the management terminal 201, such a matter that there is no other data in the management terminal 201, by a content of the MAC header 207 of the received QoS data+CF-Poll frame 81a, and such a matter that there is also no other data in itself, by the QoS data+CF-Ack frame 92a. Therefore, the communication terminals 202a, when it receives the QoS CF-Ack frame 83, turns on power, until such a time point that power is turned on so as to be able to receive a next beacon frame 80. Therefore, a power on period of the communication terminal 202a in this case becomes as shown by 85a" (broken line).

The communication terminal 202b does not have an instruction from the management terminal 201, during the power on period 85a. Therefore, it continues a power on status. In the aftermath of the power on period 85a, the management terminal 201 transmits a QoS data+CF-Poll frame 81b, to the communication terminal 202b. From the received QoS data+CF-Poll frame 81b, processing, which was already described, is carried out.

The communication terminal 202b turns off power, until such time that it turns on power, so as to be able to receive a next beacon frame 89, in the same manner as in the communication terminal 202a. The power on period of the communication terminal 202b in this case becomes as shown by 85b" (broken line). Here, a status of the communication terminal 202a in case that it turned off power is not such a status that electric power supply to all circuits is stopped completely, but is such a status that, for example, electric power is supplied only to a circuit which is necessary for activating an entirety of the communication terminal 202a within predetermined time.

The communication terminal 202c does not have an instruction from the management terminal 201 during the power on periods 85a, 85b. Therefore, it continues a power on status. In the aftermath of the power on period 85b, the management terminal 201 transmits a QoS data+CF-Poll frame 81c, to the communication terminal 202c. From the received QoS data+CF-Poll frame 81c, processing, which was already described, is carried out.

Meanwhile, the management terminal 201 transmits a CF-End+CF-Ack frame 84, in lieu of the CF-Ack frame 83. This is because to terminate the centralized management period is notified, since there is no data in both of the management terminal 201 and the communication terminals 202a, 202b, 202c.

The communication terminal 202c turns off power until such time that it turns on power, so as to be able to receive a next beacon frame 80, in the same manner as the communication terminals 202a and 202b. The power on period of the communication terminal 202c in this case becomes as shown by 85c" (broken line).

In addition, such an order that the management terminal 201 processes the communication terminals 202a, 202b, 202c during the centralized management period is determined at the time that the management terminal 201 starts managing the respective communication terminals 202a, 202b, 202c, and it is a fixed order after that. These specifications are shown by the IEEE802.11 standard.

Then, in the suchlike related communication system, it is possible to earlier turn off power of a communication terminal which completed transmission/reception of data earlier. However, there is such a necessity that a communication terminal, which has not yet completed transmission/reception of data, continues to turn on power, even during such a period that another communication terminal is transmitting/receiving. On this account, a communication terminal, for which a processing order is late from a reference frame, consumes electric power wastefully. In particular, in a communication terminal which is operating by a battery, a condition which relates to communication time such as power consumption in a certain period and battery remaining quantity is not enjoined on the occasion of determining a processing order.

In addition, a processing order is fixed and always the same. On this account, there is such a case that a unfavorable and late processing order is always allocated to a specific communication terminal, with respect to power consumption. Then, there was such a problem that communication time of that specific communication terminal is shortened.

A communication system of an embodiment 6, which solves the above-described problem, will be hereinafter described.

A hardware configuration of a management terminal, a communication terminal 2 which configure the communication system 100 which relates to the embodiment 6 is the same as that shown in the embodiment 1 (see, FIGS. 1 through 5).

Figure 17:
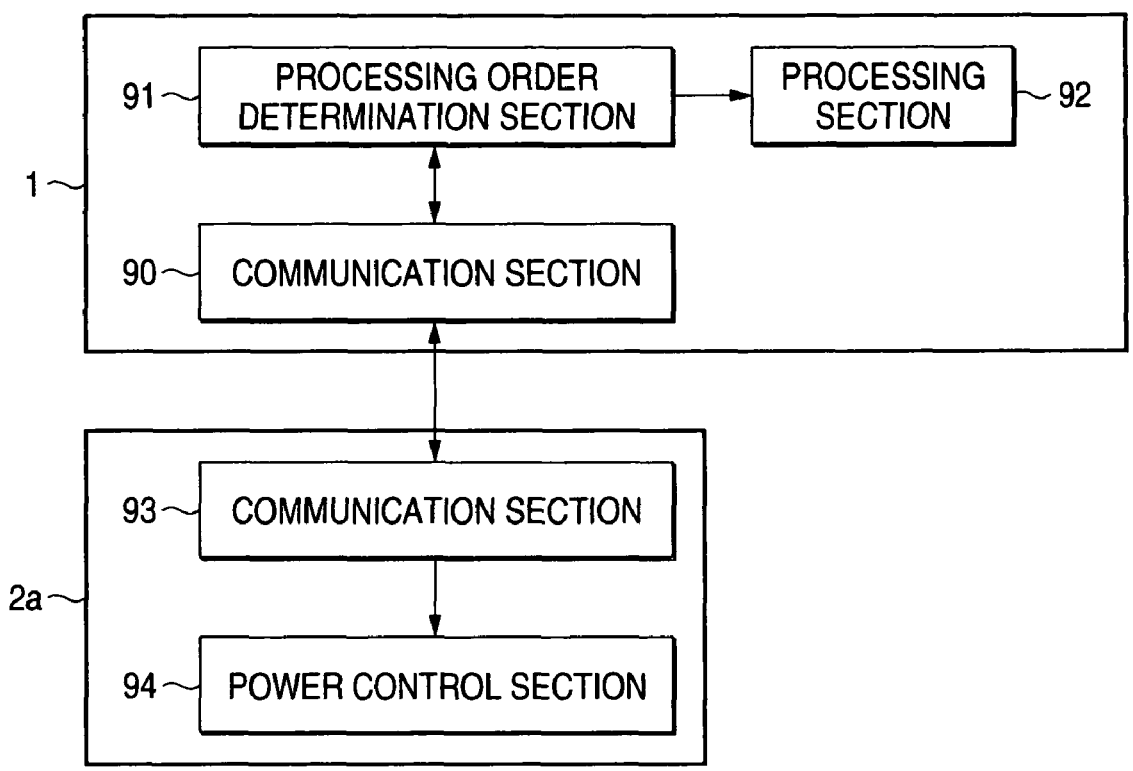
FIG. 17 is a functional block diagram of a management terminal and a communication terminal in the embodiment 6 of the invention.

FIG. 17 is a functional block diagram of a management terminal and a communication terminal in the embodiment 6 of the invention.

In FIG. 17, a management terminal is equipped with a communication section 90 which carries out communication with each communication terminals 2a, 2b, 2c, and a processing order determination section 91 which determines an order of communication, and a processing section 92 which carries out various information processing.

In addition, the communication terminal 2a is equipped with a communication section 93 which carries out communication with the management terminal 1, and a power control section 94 which control power of the communication terminal 2a. Meanwhile, a configuration and processing of the communication terminal 2b, 2c are the same as a configuration and processing of the communication terminal 2a.

Meanwhile, a physical layer frame of IEEE802.11, which is transmitted through a wireless communication path 101 between terminals, is also the same as the configuration of FIG. 7 which was explained in the embodiment 1.

Figure 18:
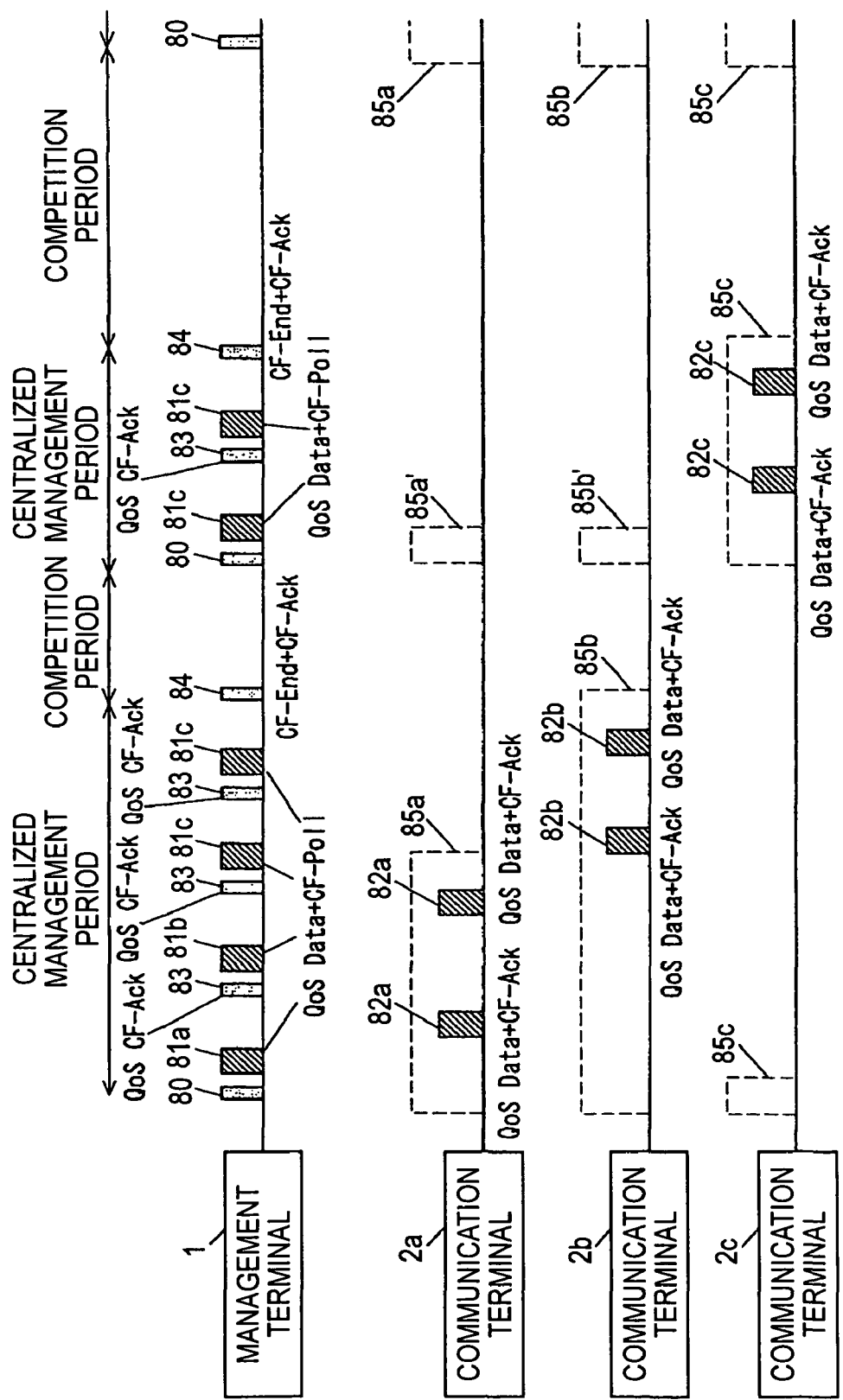
FIG. 18 is a time chart which shows an operation of a communication system in the embodiment 6 of the invention.

FIG. 18 is a time chart in the communication system according to the embodiment 6 at certain timing, and the same numbers as numbers described in related art have the same meanings.

In FIG. 18, the management terminal 1 manages three units of communication terminals 2a, 2b, 2c in a divided manner of two groups (the communication terminals 2a, 2b and the communication terminal 2c). It notifies that only data addressed to the communication terminals 2a, 2b has been stored, by first and third beacon frames 80. It notifies that only data addressed to the communication terminal 2c has been stored by a second beacon frame 80.

Meanwhile, as two grouping methods, they are grouped in such a manner that use time of each group becomes the same, and in case that there is variation in battery remaining quantity of each communication terminal, they are grouped into a small number group of smaller battery remaining quantity and a large number group of larger battery remaining quantity, in order to suppress power consumption of a communication terminal in which battery remaining quantity is small, and in such a manner, there exists an optimum grouping method depending on a circumstance and an object.

The communication terminals 2a, 2b, 2c turn on power at such timing that they can receive all beacon frames 80. In case that data addressed to itself is not stored, power off (power on period 85a', power on period 85b', and power on period 85c') is carried out immediately. In case that data addressed to itself has been stored, power on (power on period 85a', power on period 85b', and power on period 85c') is carried out until such time that reception of all data addressed to itself and transmission of all data addressed to the management terminal are completed.

In order to receive the first beacon frame 80, the communication terminals 2a, 2b, 2c turn on power. As to the communication terminals 2a, 2b, there is data addressed to themselves, and therefore, they continue a power on status. As to the communication terminal 2c, there is no data addressed to itself, it turns off power.

The management terminal 1 transmits a QoS data+CF-Poll frame 81a which carries out transmission of data addressed to the communication terminal 2a and permission of data from the communication terminal 2a at the same time, to the communication terminal 2a.

The communication terminal 2a, since it has data addressed to the management terminal 1, transmits a QoS data+CF-Ack frame 82a which carries out to show that it received the QoS data+CF-Poll frame 81a during a centralized management period and data transmission to the management terminal 1 at the same time, to the management terminal 1. In a MAC header 105 (see, FIG. 7) of this QoS data+CF-Ack frame 82a, the communication terminal 2a notifies to the management terminal 1 whether there is other data or not. In this embodiment, it notifies that there is other data.

Subsequently, the management terminal 1 transmits the QoS data+CF-Poll frame 81a to the communication terminal 2a. The communication terminal 2a, since it has data addressed to the management terminal 1, transmits the QoS data+CF-Ack frame 82a to the management terminal 1. In the MAC header 105 of this QoS data+CF-Ack frame 82a, the communication terminal 2a notifies to the management terminal 1 that there is no other data.

In the related example shown in FIG. 28, data is transmitted only one by one from the management terminal 201 and the communication terminals 202a, 202b, 202c, at intervals of each beacon frame 80. In contrast to this, it is simply possible to transmit data once in two times at the interval of the beacon frame 80 between the management terminal 1and each communication terminal 2a, 2b, 2c.

Then, in this embodiment, data is transmitted two by two from the management terminal 1 and the communication terminals 2a, 2b, 2c at intervals of each beacon frame 80. Therefore, in the MAC header 105 of the first QoS data+CF-Ack frame 82a, it is notified that there is also other data, and in the MAC header 105 of the second QoS data+CF-Ack frame 82a, it is notified that there is no other data since there is second data.

The management terminal 1, when it receives the QoS data+CF-Ack frame 82a, transmits a QoS CF-Ack frame 83 which shows that it received data from the communication terminal 2a during the centralized management period, to the communication terminal 2a.

The communication terminal 2a has notified to the management terminal such a matter that there is no other data in the management terminal by a content of the MAC header 105 of the already received QoS data+CF-Poll frame 81a, and such a matter that there is also no other data in itself by the QoS data+CF-Ack frame 82a.

Therefore, when it receives the QoS CF-Ack frame 83, it turns off power until such a time point for turning on power, so as to be able to receive a next beacon frame 80. By the foregoing, a power on period of the communication terminal 2a becomes as shown by 85a (broken line).

The communication terminal 2b continues a power on status since there is no instruction from the management terminal 1 during the power on period 85a. After the passage of the power on period 85a, the management terminal 1 transmits the QoS data+CF-Poll frame 81b to the communication terminal 2b. In processing between the communication terminal 2a and the management terminal 1, when the QoS data+CF-Poll frame 81b is received, processing of transferring data two by two between the communication terminal 2b and the management terminal 1 is carried out, in the same manner as above described. Meanwhile, the management terminal 1 transmits a CF-End+CF-Ack frame 84, in lieu of the second QoS CF-Ack frame 83 to the second QoS data+CF-Ack frame 82b.

The communication terminal 2b turns off power until it turns on power, so as to be able to receive a next beacon frame 80, in the same manner as in the communication terminal 2a. By the foregoing, a power off period of the communication terminal 2b becomes as shown by 85b (broken line).

As to the communication terminal 2c, data addressed to itself is not stored in the first beacon frame 80. Therefore, it turns off power immediately after the first beacon frame 80. By this, a power on period of the communication terminal 2c becomes as shown by 85c' (broken line).

Next, a time chart from the second beacon frame 80 will be described. Here, as to the communication terminals 2a, 2b, data addressed to themselves is not stored in the second beacon frame 80. Therefore, they turn off power immediately after the second beacon frame 80. A power on period of the communication terminal 2a becomes as shown by 85a' (broken line). A power on period of the communication terminal 2b becomes as shown by 85b' (broken line).

As to the communication terminal 2c, data addressed to itself has been stored in the second beacon frame 80. Therefore, a power on status is continued. In the aftermath of the second beacon frame 80, the management terminal transmits a QoS data+CF-Poll frame 81c, to the communication terminal 2c. From the received QoS data+CF-Poll frame 81c, processing, which was already explained, is carried out.

Meanwhile, the management terminal 1 transmits a CF-End+CF-Ack frame 84, in lieu of the second QoS CF-Ack frame 84 to the second QoS data+CF-Ack frame 82c.

After that, the communication terminal 2c turns off power until it turns on power, so as to be able to receive a third beacon frame 80. A power on period of the communication terminal 2c in this case becomes as shown by 85c (broken line).

Here, respective power on periods will be calculated. A length of a data link layer frame 104 (see, FIG. 7) in this embodiment is 130 bytes in case of the beacon frame 80, and 30 bytes in case of the QoS CF-Ack frame 83, and 20 bytes in case of the CF-End+CF-Ack frame 84.

In addition, this embodiment assumes a voice call, and voice data, which adopted G,711 of codec with a sample rate 20 ms and in which a length of a data link layer frame 104 is 252 bytes, is transmitted in the QoS data+CF-Poll frame 81a and the QoS data+CF-Ack frame 82a, respectively.

In addition, all frames meet standards of 802.11b and 802.11e, and SIFS is of 10 μs and a PHY header 103 is of 192 μs. In addition, a data rate is 1 Mpbs in the beacon frame 80, and all frame sequences other than the beacon frame 80 are all transmitted by 11 Mbps.

Further, an interval of the beacon frame 80 is 20 ms, and the communication terminals 2a, 2b, 2c are to turn on power (called as power up time) 10 μs earlier than start of the beacon frame 80, in order to receive the beacon frame 80. Also in case that the communication terminals 2a, 2b, 2c turn off power (called as power down time), it is to take approximately 10 μs.

The time, which is necessary for respective physical layer frames 102 (see, FIG. 7), will be calculated. Time etc. of the beacon frame 80 is calculated as follows.

Beacon frame 80 =

$$PHY \text{ header } 103 + \text{length of data link layer frame } 104 =$$

$$192 + (130 \times 8/1) = 1232 \ (\mu s)$$

QoS data + CF-Poll frames 81a, 81b, 81c +QoS data +

-continued $$CF\text{-}Ack \text{ frames } 82a, 82b, 82c = 192 + (252 \times 8/11) \cong 375.3 \ (\mu s)$$

$$Qos \ CF\text{-}Ack \text{ frame } 83 = 192 + (30 \times 8/11) \cong 213.8 \ (\mu s)$$

$$CF\text{-End} + CF\text{-}Ack \text{ frame } 84 = 192 + (20 \times 8/11) \cong 206.5 \ (\mu s)$$

With reference to FIG. 28, respective power on time of the communication terminals 202a, 202b, 202c which were explained in the related example will be calculated. The power on period 85a" of the communication terminal 202a is calculated as follows.

(Power up time) + (beacon frame 80) +

$$(SIFS) + (QoS \text{ data} + CF\text{-Poll frame } 81a) + (SIFS) +$$

$$(QoS \text{ data} + CF\text{-}Ack \text{ frame } 82a) + (SIFS) +$$

$$(QoS \ CF\text{-}Ack \text{ frame } 83) + (\text{power down time}) =$$

$$10 + 1232 + 10 + 375.3 + 10 + 375.3 + 10 + 213.8 + 10 = 2246.4 \ (\mu s)$$

The power on period 85b" of the communication terminal 202b is calculated as follows.

(Power up time) + (beacon frame 80) +

$$(SIFS) + (QoS \text{ data} + CF\text{-Poll frame } 81a) + (SIFS) +$$

$$(QoS \text{ data} + CF\text{-}Ack \text{ frame } 82a) + (SIFS) +$$

$$(QoS \ CF\text{-}Ack \text{ frame } 83) + (SIFS) + (QoS \text{ data} + CF\text{-Poll frame } 81b) +$$

$$(SIFS) + (QoS \text{ data} + CF\text{-}Ack \text{ frame } 82b) + (SIFS) +$$

$$(QoS \ CF\text{-}Ack \text{ frame } 83) + (\text{power down time}) =$$

$$10 + 1232 + 10 + 375.3 + 10 + 375.3 + 10 + 213.8 + 10 +$$

$$375.3 + 10 + 375.3 + 10 + 213.8 + 10 = 3240.8 \ (\mu s)$$

The power on period 85c" of the communication terminal 202c is calculated as follows.

(Power up time) + (beacon frame 80) +

$$(SIFS) + (QoS \text{ data} + CF\text{-Poll frame } 81a) + (SIFS) +$$

$$(QoS \text{ data} + CF\text{-}Ack \text{ frame } 82a) + (SIFS) +$$

$$(QoS \ CF\text{-}Ack \text{ frame } 83) + (SIFS) + (QoS \text{ data} + CF\text{-Poll frame } 81b) +$$

$$(SIFS) + (QoS \text{ data} + CF\text{-}Ack \text{ frame } 82b) + (SIFS) +$$

$$(QoS \ CF\text{-}Ack \text{ frame } 83) + (SIFS) + (QoS \text{ data} + CF\text{-Poll frame } 81c) +$$

$$(SIFS) + (QoS \text{ data} + CF\text{-}Ack \text{ frame } 82c) + (SIFS) +$$

$$(CF\text{-End} + CF\text{-}Ack \text{ frame } 84) + (\text{power down time}) =$$

$$10 + 1232 + 10 + 375.3 + 10 + 375.3 + 10 + 213.8 +$$

$$10 + 375.3 + 10 + 375.3 + 10 + 213.8 + 10 +$$

$$375.3 + 10 + 375.3 + 10 + 206.5 + 10 = 4227.9 \ (\mu s)$$

In this embodiment, two intervals of the beacon frame 80 are used as one unit. Therefore, two times of power on time of each communication terminal in the related example is uses as time to be compared with power on time of each communication terminal which relates to this embodiment, i.e., comparison power on time of the related example.

The comparison power on time of the communication terminal 2a in the related example is 4492.8 µs. The comparison power on time of the communication terminal 2b in the related example is 6481.6 µs. The comparison power on time of the communication terminal 2c in the related example is 8455.8 µs.

Next, respective power on time of the communication terminals 2a, 2b, 2c in case of this embodiment will be calculated.

The power on period 85a of the communication terminal 2a is calculated as follows.

(Power up time) + (beacon frame 80) +

(SIFS) + (QoS data + CF-Poll frame 81a) + (SIFS) +

(QoS data + CF-Ack frame 82a) + (SIFS) +

(QoS CF-Ack frame 83) + (SIFS) + (QoS data + CF-Poll frame 81a) +

(SIFS) + (QoS data + CF-Ack frame 82a) + (SIFS) +

(QoS CF-Ack frame 83) + (power down time) =

10 + 1232 + 10 + 375.3 + 10 + 375.3 + 10 + 213.8 + 10 +

375.3 + 10 + 375.3 + 10 + 213.8 + 10 = 3240.8 (µs)

The power on period 85b of the communication terminal 2b is calculated as follows.

(Power up time) + (beacon frame 80) +

(SIFS) + (QoS data + CF-Poll frame 81a) + (SIFS) +

(QoS data + CF-Ack frame 82a) + (SIFS) +

(QoS CF-Ack frame 83) + (SIFS) + (QoS data + CF-Poll frame 81a) +

(SIFS) + (QoS data + CF-Ack frame 82a) + (SIFS) +

(QoS CF-Ack frame 83) + (SIFS) + (QoS data + CF-Poll frame 81b) +

(SIFS) + (QoS data + CF-Ack frame 82b) + (SIFS) +

(QoS CF-Ack frame 83) + (SIFS) + (QoS data + CF-Poll frame 81b) +

(SIFS) + (QoS data + CF-Ack frame 82b) + (SIFS) +

(CF-End + CF-Ack frame 84) + (power down time) =

10 + 1232 + 10 + 375.3 + 10 + 375.3 + 10 + 213.8 + 10 + 375.3 +

10 + 375.3 + 10 + 213.8 + 10 + 375.3 + 10 + 375.3 + 10 +

213.8 + 10 + 375.3 + 10 + 375.3 + 10 + 206.5 + 10 = 5222.3 (µs)

The power on period 85c of the communication terminal 2c is calculated as follows.

(Power up time) + (beacon frame 80) +

(SIFS) + (QoS data + CF-Poll frame 81c) + (SIFS) +

(QoS data + CF-Ack frame 82c) + (SIFS) +

(QoS CF-Ack frame 83) + (SIFS) + (QoS data + CF-Poll frame 81c) +

(SIFS) + (QoS data + CF-Ack frame 82c) + (SIFS) +

(CF-End + CF-Ack frame 84) + (power down time) =

10 + 1232 + 10 + 375.3 + 10 + 375.3 + 10 + 213.8 + 10 +

375.3 + 10 + 375.3 + 10 + 206.5 + 10 = 3233.5 (µs)

The power on period 85a' of the communication terminal 2a, the power on period 85b' of the communication terminal 2b, and the power on period 85c' of the communication terminal 2c are all the same, and calculated as follows.

(Power up time) + (beacon frame 80) + (power down time) =

10 + 1232 + 10 = 1252 (µs)

The time to be compared with power on time of each communication terminal which relates to the related example, i.e., the comparison power on time is sum of the above-described two power on time. The comparison power on time of the communication terminal 2a is calculated as follows.

Power on period 85a + power on period 85a' =

3240.8 + 1252 = 4492.8 (µs)

The comparison power on time of the communication terminal 2b is calculated as follows.

Power on period 85b + power on period 85b' =

5222.3 + 1252 = 6474.3 (µs)

The comparison power on time of the communication terminal 2c is calculated as follows.

Power on period 85c + power on period 85 c' = 3233.5 + 1252

= 4485.5 (µs)

By the foregoing, power on time which relates to the related example, and power on time which relates to this embodiment will be compared. In the communication terminal 2a, they are equivalent as 4492.8:4492.8 in the related example and this embodiment. Also in the communication terminal 2b, they are almost equivalent as 6481.6:6474.3. In the communication terminal 2c, 8455.8:4485.5 is realized. That is, it means that power on time could be reduced by 47%.

In this manner, in this embodiment which was described with reference to FIG. 18, it is possible to obtain an advantage of reduction of power on time only to the communication terminal 2c. By changing a group to be managed, it is possible to obtain the same advantage of reduction of power on time, as to another communication terminal.

For example, in case that the communication terminals 2a, 2c are grouped in the same group, comparison power on time of the communication terminal 2b becomes comparison power on time of the communication terminal 2c which relates to the embodiment earlier described, i.e., 4485.5 µs. Meanwhile, comparison power on time of the communication terminal 2c becomes comparison power on time of the communication terminal 2b which relates to the embodiment earlier described, i.e., 6474.3 μs.

Therefore, when comparison of power on time which relates to the related example and power on time which relates to this embodiment is carried out, 6481.6:4485.5 is realized in the communication terminal 2b. That is, it is possible to reduce power on time by 33%. In the communication terminal 2c, 8455.8:6474.3 is realized. That is, it is possible to reduce power on time by 23%.

In this manner, processing is carried out by dividing communication terminals into two groups such as a group up to a certain communication terminal and a group from a communication terminal after the certain communication terminal with the same processing order as in the related example, and thereby, it is possible to reduce power on time to a communication terminal which belongs to the latter group. Therefore, it is possible to enlarge reduction quantity of individual communication terminals.

On the one hand, grouping is carried out alternately by a processing order and processing is carried out by that order, and thereby, reduction quantity of individual communication terminals gets smaller, but it is possible to reduce power on time to all communication terminals other than the first communication terminal in the related example.

This embodiment described such a case that there are three units of communication terminals and they are divided into two groups, but it is needless to say that the number of communication terminals may be any number and grouping may be carried out into any number of groups if they are divided into two or more groups. In addition, it described a case of voice data, but it is needless to say that data of each communication terminal may be of a similar size and be periodic. In addition, it described a case of a certain assumed value for the purpose of calculation, but it is needless to say that it may not be the assumed value.

As above, according to this embodiment, it is a communication system which is configured by a management terminal which manages a medium and a communication terminal which is managed by the management terminal and in which power on and power off can be changed at arbitrary timing, and the communication terminal turns on power in tune with start of each reference frame of the management terminal, and the management terminal notifies to the communication terminal frame stored information which represents existence of a frame addressed to the communication terminal, within the reference frame, and the communication terminal, in case that a frame addressed to its own terminal is not stored, turns off power, and in case that the frame addressed to its own terminal has been stored, carries out transmission/reception of a frame to/from the management terminal, and when transmission/reception of all frames is completed, it can turn off power.

That is, it is a communication system comprising a communication terminal, and a management terminal which manages the communication terminal, wherein the management terminal comprises a communication unit which transmits a reference frame including frame stored information which shows that there exists a frame addressed to the communication terminal, to the communication terminal, and wherein the communication terminal comprises a communication unit which receives the reference frame, and a power control unit which turns off power in case that frame stored information is not included in the reference frame received by the communication unit of the communication terminal, after it turns on power in tune with timing for receiving the reference frame from the management terminal.

Further, the power control unit of the communication terminal turns on power, in tune with timing for receiving the reference frame from the management terminal, and turns off power after transmission/reception of a frame to/from the management terminal is completed, in case that frame stored information is included in the reference frame which was received by the reception unit.

Further, the communication system comprises a plurality of communication terminals, and wherein the communication unit of the management terminal transmits the reference frame including the frame stored information, to a part of communication terminals among the plurality of communication terminals. That is, n units of communication terminals are divided into two groups, the reference frame, which includes the frame stored information, is transmitted only to a communication terminal in any one of the groups.

Therefore, for example, if n units of communication terminals are divided into two groups and processing is carried out only to a communication terminal in any one of the groups with respect to each reference frame, it is possible to obtain such favorable advantages that it is possible to reduce a processing order of maximum (n−1) units, and especially, it is possible to reduce electric power which is wastefully consumed in a communication terminal for which a processing order is late from the reference frame.

Embodiment 7

A communication system, which relates to an embodiment 7, will be described by use of FIGS. 19A, 19B, 19C. Meanwhile, conditions relating to communication of the communication system which relates to the embodiment 7 are the same as those of the communication system 100a which relates to the embodiment 6.

FIGS. 19A through 19C are views which show a processing order management table that is utilized on the occasion that a management terminal 1 in the embodiment 7 manages each communication terminal 2a through 2c. FIG. 19A is a processing order management table at the time of transmission of a predetermined beacon frame. FIG. 19B is a processing order management table at the time of transmission of a beacon frame which is next to transmission of a beacon frame which corresponds to FIG. 19A. FIG. 19C is a processing order management table at the time of transmission of a beacon frame which is next to transmission of a beacon frame which corresponds to FIG. 19B.

In this manner, the management terminal 1, which relates to the embodiment 7, changes an order of communicating with a plurality of communication terminals 2a, 2b, 2c, which become management objects, at arbitrary timing.

Next, a time chart of the communication system, which relates to the embodiment 7, will be described.

Basic operations of the management terminal 1 and the communication terminals 2a, 2b, 2c are the same as the operations shown in FIG. 28, and will be described by use of its time chart. In this regard, however, it will be described by replacing the management terminal 201 in FIG. 28 with the management terminal 1 in this embodiment, and replacing the communication terminals 201a, 201b, 201c with the communication terminals 2a, 2b, 2c, respectively. In addition, individual conditions relating to communication etc. are the same as in the case of the embodiment 6. That is, time, which is required for respective physical layer frames 102 (see, FIG. 16), is the same as in the case of the embodiment 6.

In addition, power on time within intervals of respective beacon frames 80 of the communication terminals 2a, 2b, 2c in FIG. 28 is the same as in the embodiment 6. That is, power on time of the communication terminal 2a is 2246.4 μs, and power on time of the communication terminal 2b is 3240.8 μs, and power on time of the communication terminal 2c is 4227.9 μs.

Power on time as a cumulative total in three cycles (60 ms period) in the communication system which relates to the related example becomes time as follows in the communication terminal 2a.

2246.4 μs×3≅6.74 (ms)

In addition, the following time is realized in the communication terminal 2b.

3240.8 μs×3≅9.72 (ms)

In addition, the following time is realized in the communication terminal 2c.

4227.9 μs×3≅12.68 (ms)

Therefore, as to power consumption per unit time of each communication terminal, the following deference between maximum and minimum is to be generated.

12.68/6.74=1.88

In this manner, in the related communication system, such an order that a communication terminal is communicating is determined at the time that a management terminal starts management of a communication terminal, and it is fixed after that, and therefore, a difference of power consumption was generated with respect to each communication terminal.

In contrast to this, in the communication system which relates to the embodiment 7, a processing order is made to be changed in an order of FIG. 19A→FIG. 19B→FIG. 19C→FIG. 19A→FIG. 19B→FIG. 19C, . . . , with respect to each beacon frame 80. Therefore, power on time as a cumulative total in 3 cycles (60 ms period) becomes the following value in each communication terminal 2a, 2b, 2c, respectively. That is, it becomes the same value in any communication terminal.

2246.4+3240.8+4227.9≅9.72 (ms)

In this manner, in the communication system which relates to the embodiment 7, by configuring in such a manner that an order of communicating with a plurality of communication terminal is changeable, it is possible to realize equation of power consumption with respect to each communication terminal.

In the related example, such an order that a communication terminal is communicating is determined at the time that a management terminal stars management of a communication terminal, and it is fixed after that, whereas, in this embodiment, it is configured in such a manner that an order is changeable at arbitrary timing.

Meanwhile, this embodiment described such a case that there are three units of communication terminals, but it is needless to say that the number of communication terminals may be any number. In addition, it described a case of voice data, but it is needless to say that data of each communication terminal may be of a similar size and be periodic.

In addition, it described a case of a certain assumed value for the purpose of calculation, but it is needless to say that it may not be the assumed value. In addition, it described such a case that a processing order is set in such a manner that a first voce communication terminal is processed at the last, and an order of remaining voice communication terminals is expedited one by one, respectively, but it is needless to say that there may be no problem to change a processing order in any manner, if something is carried out in such a manner that power consumption is averaged.

As above, according to this embodiment, it is a communication system which is configured by a management terminal which manages a medium, and a communication terminal which is managed by the management terminal and in which power on and power off can be changed at arbitrary timing, and the communication terminal turns on power in tune with start of each reference frame of the management terminal, and turns off power when transmission/reception of all frames to/from the management terminal is completed, and the management terminal can change a processing order from a reference frame to a plurality of communication terminals.

That is, it is a communication system comprising a plurality of communication terminals and a management terminal which manages the communication terminals, wherein the management terminal comprises a processing order determination unit which determines a processing order from the reference frame, and a communication unit which carries out communication with each communication terminal, in accordance with the processing order which was determined by the processing order determination unit, and the communication terminal comprises a communication unit which receives the reference frame, and a power control unit which turns off power after transmission/reception of a frame to/from the management terminal is completed, after it turns on power in tune with timing for receiving the reference frame from the management terminal.

Therefore, if a processing order is changed so as to realize equation of time of a power on status, it is possible to obtain such favorable advantages that it is possible to realize equation of power consumption of each communication terminal, and it is possible to realize equation of power consumption of each communication terminal which is in a period of call.

Embodiment 8

A communication system, which relates to an embodiment 8, will be described by use of FIGS. 20A, 20B, 20C. Condition relating to communication of the communication system which relates to the embodiment 8 are the same as the communication system which relates to the embodiment 6.

FIGS. 20A through 20C show a processing order management table which is utilized on the occasion that a management terminal 1 in the embodiment 7 manages each communication terminal 2a through 2c. FIG. 20A is a processing order management table at the time that only one unit of a communication terminal is calling, i.e., only the communication terminal 2a is communication. FIG. 20B is a processing order management table at the time the two units of communication terminals are calling, i.e., at the time of communication of the communication terminals 2a, 2b. FIG. 20C is a processing order management table at the time that three units of communication terminals are calling.

In the related communication system, such an order that a communication terminal is communicating is determined at the time that a management terminal starts management of a communication terminal, and it is fixed after that, whereas, in the communication system which relates to the embodiment 8, it is configured so as to communicate in such an order that a call was started.

Next, an operation of the communication system which relates to the embodiment 8 will be described. In case that only the communication terminal 2a started a call from such a status that none of the communication terminals 2a, 2b, 2c is not calling, it follows the processing order management table shown in FIG. 20A. In FIG. 20A, the communication terminal 2a is set up in 1 of the processing order. It shows that nothing is set up in 2 and 3 of the processing order. Therefore, communication is carried out only with the communication terminal 2a.

Next, in such a status that a call of the communication terminal 2b was started during such a period that a call with the communication terminal 2a is going on, it follows the processing order management table shown in FIG. 20B. In FIG. 20B, the communication terminal 2a is set up in 1 of the processing order. The communication terminal 2b is set up in 2 of the processing order. Nothing is set up in 3 of the processing order. Therefore, communication is carried out in the order corresponding to the communication terminals 2a, 2b.

Lastly, in such a status that a call of the communication terminal 2c was started during such a period that calls with the communication terminals 2a, 2b are going on, it follows the processing order management table shown in FIG. 20C. In FIG. 20C, the communication terminal 2a is set up in 1 of the processing order. The communication terminal 2b is set up in 2 of the processing order. The communication terminal 2c is set up in 3 of the processing order. Therefore, communication is carried out in the order corresponding to the communication terminals 2a, 2b, 2c.

Here, respective average consumption currents of the communication terminals 2a, 2b, 2c in a calling status will be calculated. In the same manner as in the embodiment 7, it is assumed that time of beacon frame 80 intervals is 20 ms, and power on time is 2246.4 μs in case of the communication terminal 2a, and 3240.8 μs in case of the communication terminal 2b, and 4227.9 μs in case of the communication terminal 2c. In reality, a consumption current is different between a transmission status and a reception status, but in this embodiment, it is assumed that it is made to be the same and a consumption current in a power on status is 1200 mA. An average consumption current in a calling status is calculated as follows.

(Consumption current in a power on status)×(power on time)/(beacon frame 80 interval)

Thus, the average consumption current becomes the following value in case of the communication terminal 2a.

1200×2246.4/20000≅134.8 (mA)

It becomes the following value in case of the communication terminal 2b.

1200×3240.8/20000≅194.4 (mA)

It becomes the following value in case of the communication terminal 2c.

1200×4227.9/20000≅253.7 (mA)

In case that the communication terminal 2a starts a call and the communication terminal starts a call, 10 minutes later from the start and the communication terminal 2c starts a call, 5 minutes later from the call start of the communication terminal 2b and all calls by the communication terminals 2a, 2b, 2c are terminated at the same time, 15 minutes later from the call start of the communication terminal 2c, i.e., in case that the communication terminal 2a made a call for 30 minutes and the communication terminal 2b made a call for 20 minutes and the communication terminal 2c made a call for 15 minutes, respective consumption current quantities are carried out.

Consumption current quantity mAh is calculated by "consumption current×time". Therefore, consumption current quantity of the communication terminal 2a becomes the following value.

134.8×(30/60)=67.4 (mAh)

Consumption current quantity of the communication terminal 2b becomes the following value.

194.4×(20/60)=64.8 (mAh)

Consumption current quantity of the communication terminal 2c becomes the following value.

253.7×(15/60)≅63.4 (mAh)

In this manner, call time of each communication terminal 2a through 2c is different, but as consumption current quantity, it becomes substantially the same result in all of the communication terminals. That is, it is understood that equation of power consumption quantity is realized.

This embodiment described such a case that there are 3 units of communication terminals, but it is needless to say that the number of communication terminals may be any number. In addition, it described a case of voice data, but it is needless to say that data of each communication terminal may be of a similar size and be periodic. In addition, it described a case of a certain assumed value for the purpose of calculation, but it is needless to say that it may not be the assumed value.

As above, according to this embodiment, it is a communication system which is configured by a management terminal which manages a medium, and a communication terminal which is managed by the management terminal and in which power on and power off can be changed at arbitrary timing, and the communication terminal turns on power in tune with start of each reference frame of the management terminal, and turns off power when transmission/reception of all frames to/from the management terminal is completed, and thereby, the management terminal can process a frame in the order corresponding to a communication terminal which started transmission/reception of a frame.

That is, the management terminal further comprises a processing unit which carries out processing of a frame to each communication terminal, in accordance with such an order that communication was started, when the communication unit starts communication.

Therefore, it is possible to obtain such a favorable advantage that it is possible to reduce a difference of consumption current quantity of each communication terminal during a certain period, without the management terminal carrying out complex processing.

Embodiment 9

A communication system, which relates to an embodiment 9, will be described by use of FIG. 21A, FIG. 21B, FIG. 22A, FIG. 22B and FIG. 22C. Meanwhile, an entire configuration of the communication system which relates to the embodiment 9 is almost the same as an entire configuration of the communication system which relates to the embodiment 6 that was described with reference to FIG. 18. In this regard, however, a management terminal 1, which relates to the embodiment 9, is assumed to be further equipped with a power on cumulative time management table storage section (not shown in the figure) which further manages power on cumulative time.

FIG. 21A shows a status of a power on cumulative time management table after predetermined time passed over from reference time. Meanwhile, here, the reference time is assumed to be 8 a.m. in this embodiment. In FIG. 21A, cumulative power on time of the communication terminal 2a is 30 minutes, and cumulative power on time of the communication terminal 2b is 20 minutes, and cumulative power on time of the communication terminal 2c is 10 minutes. In addition, FIG. 21B shows a status of the cumulative time management table after 20 minutes has further passed over from FIG. 21A.

FIG. 22A shows a processing order management table at the time that only one unit of a communication terminal is calling, i.e., at the time of communication of only the communication terminal 2c. FIG. 22B shows a processing order management table at the time that two units of communication terminals are calling, i.e., at the time of communication of the communication terminals 2a, 2c. FIG. 22C is a processing order management table at the time that three units of communication terminals are calling.

In the related example, such an order that a communication terminal is communicating is determined at the time that a management terminal stars management of a communication terminal, and it is fixed after that, whereas, in the communication system which relates to the embodiment 9, it is configured so as to determine order of communication, on the basis of power on cumulative time at the time of start of a call. By this means, for example, it is possible to start communication from a communication terminal in which power on cumulative time is long.

Next, an operation of the communication system which relates to the embodiment 9 will be described.

In case that only the communication terminal 2c started a call from such a status that none of the communication terminals 2a, 2b, 2c is not calling, it follows the processing order management table shown in FIG. 22A. In FIG. 22A, the communication terminal 2c is set up in 1 of the processing order. Nothing is set up in 2 and 3 of the processing order. Therefore, communication is carried out only with the communication terminal 2c.

Next, in such a status that a call of the communication terminal 2a was started during such a period that a call with the communication terminal 2c is going on, it follows the processing order management table shown in FIG. 22B. In FIG. 22B, the communication terminal 2a is set up in 1 of the processing order. The communication terminal 2c is set up in 2 of the processing order. In this manner, in the communication system which relates to the embodiment 9, a much earlier processing order is allocated to a communication terminal in which power on cumulative time from reference time is large.

Lastly, in such a status that a call of the communication terminal 2b was started during such a period that calls with the communication terminals 2a, 2c are going on, it follows the processing order management table shown in FIG. 22C. In FIG. 22C, the communication terminal 2a is set up in 1 of the processing order, and the communication terminal 2b is set up in 2 of the processing order, and the communication terminal 2c is set up in 3 of the processing order. In this manner, even in FIG. 22C, a processing order is allocated in the order corresponding to such a matter that power on cumulative time from the reference time is large.

Here, respective power on cumulative time of the communication terminals 2a, 2b, 2c at a time point of FIG. 22B will be calculated. In the same manner as in the embodiment 7, it is assumed that time of beacon frame 80 interval is 20 ms. It is also assumed that power on time is 2246.4 μs in case of the communication terminal 2a, and 3240.8 μs in case of the communication terminal 2b, and 4227.9 μs in case of the communication terminal 2c.

For ease of calculation, it is assumed that such time that a status of FIG. 22C is realized from FIG. 22A through FIG. 22B is sufficiently small, and the communication terminals 2a, 2b, 2c made calls for 20 minutes and terminated the calls at the same time. In this case, power on cumulative time from reference time in FIG. 21B is calculated as follows.

(Power on cumulative time from reference time in $Fig.$ $21A$)×

(power on time with respect to each communication terminal)/

(beacon frame 80 interval)×(call time)

Cumulative time of the communication terminal 2a becomes the following value.

30+2246.4/20000×20≈32.2 (minutes)

Cumulative time of the communication terminal 2b becomes the following value.

20+3240.8/20000×20≈23.2 (minutes)

Cumulative time of the communication terminal 2c becomes the following value.

10+4227.9/20000×20≈14.2 (minutes)

In this case, call time is almost the same, but a maximum difference of power on cumulative time from reference time is reduced from 20 minutes to 18 minutes, and it means that equation of power consumption quantity from the reference time was realized.

This embodiment described such a case that there are three units of communication terminals, but it is needless to say that the number of communication terminals may be any number. In addition, it described a case of voice data, but it is needless to say that data of each communication terminal may be of a similar size and be periodic. In addition, it described a case of a certain assumed value for the purpose of calculation, but it is needless to say that it may not be the assumed value. In addition, it described a case of determining an order of communication on the basis of power on cumulative time at the time of start of communication, but it is needless to say that the power on cumulative time may be updated in mid-course of a call, and on the basis of it, the order of communication may be changed even in mid-course of a call.

As above, according to this embodiment, it is a communication system which is configured by a management terminal which manages a medium and a communication terminal which is managed by the management terminal and in which power on and power off can be changed at arbitrary timing, and the communication terminal turns on power in tune with start of each reference frame of the management terminal, and turns off power when transmission/reception of all frames to/from the management terminal is completed, and the management terminal stores power on cumulative time from reference time to all communication terminals, and determines a processing order of the communication terminals on the basis of the power on cumulative time, and thereby, the management terminal can process a frame.

That is, the management terminal further comprises a storage unit which stores power on cumulative time on the basis of reference time, and a processing order determination unit determines a processing order, on the basis of power on cumulative time which has been stored by the storage unit.

Therefore, if it is determined that the management terminal processes a frame in the order corresponding to a communication terminal in which power on cumulative time from the reference time was long, it is possible to shorten power on time, easier in case of a communication terminal in which power on cumulative time was long, and therefore, it is possible to obtain such a favorable advantage that it is possible to carry out equation of power consumption quantity from the reference time.

Embodiment 10

A communication system, which relates to an embodiment 10, will be described by use of FIG. 22A, FIG. 22B, FIG. 2C, FIG. 23A and FIG. 23B. FIG. 22A, FIG. 22B, FIG. 2C are the same as those described in the embodiment 9. FIG. 23A shows a battery remaining quantity management table of each communication terminal at a predetermined time point. FIG. 23B shows a battery remaining quantity management table of each communication terminal after 20 minutes passed from a time point of FIG. 23A.

More concretely, FIG. 23A shows a battery remaining quantity management table in such a case that it was notified from the communication terminal 2a that battery remaining quantity is 30 mAh by that time point and it was notified from the communication terminal 2b that battery remaining quantity is 500 mAh and it was notified from the communication terminal 2c that battery remaining quantity is 700 mAh.

Incidentally, FIG. 23B shows a battery remaining quantity management table in such a case that it was notified from the communication terminal 2a that battery remaining quantity is 255.1 mAh by that time point and it was notified from the communication terminal 2b that battery remaining quantity is 435.2 mAh and it was notified from the communication terminal 2c that battery remaining quantity is 615.4 mAh.

In the related example, such an order that a communication terminal is communicating is determined at the time that a management terminal stars management of a communication terminal, and it is fixed after that, whereas, in the communication system which relates to the embodiment 10, it is configured so as to determine an order of communication, on the basis of battery remaining quantity which was notified from a communication terminal at the time of start of a call. By this means, for example, it is possible to start communication from a communication terminal in which battery remaining quantity is few.

Next, an operation of the communication system which relates to the embodiment 10 will be described.

In case that only the communication terminal 2a started a call from such a status that none of the communication terminals 2a, 2b, 2c is not calling, it follows the processing order management table shown in FIG. 22A. In FIG. 22A, the communication terminal 2c is set up in 1 of the processing order. Nothing is set up in 2 and 3 of the processing order. Therefore, communication is carried out only with the communication terminal 2a.

Next, in such a status that a call of the communication terminal 2a was started during such a period that a call with the communication terminal 2c is going on, it follows the processing order management table shown in FIG. 22B. In FIG. 22B, the communication terminal 2a is set up in 1 of the processing order. The communication terminal 2c is set up in 2 of the processing order. In this manner, in the communication system which relates to the embodiment 10, a much earlier processing order is allocated to a communication terminal in which power on cumulative time from reference time is large.

Lastly, in such a status that a call of the communication terminal 2b was started during such a period that calls with the communication terminals 2a, 2c are going on, it follows the processing order management table shown in FIG. 22C. In FIG. 22C, the communication terminal 2a is set up in 1 of the processing order, and the communication terminal 2b is set up in 2 of the processing order, and the communication terminal 2c is set up in 3 of the processing order. In this manner, even in FIG. 22C, a much earlier processing order is allocated to a communication terminal in which battery remaining quantity is few.

A value of battery remaining quantity in FIG. 23B is one which was notified from the communication terminals 2a, 2b, 2c by that time point, but here, battery remaining quantity at a time point of FIG. 23B is calculated based on battery remaining quantity of FIG. 23A.

In the same manner as in the embodiment 8, it is assumed that time of beacon frame 80 intervals is 20 ms. It is also assumed that an average consumption current in a call status is 134.8 mA in case of a communication terminal in which a processing order is 1, and 194.4 mA in case of a communication terminal in which a processing order is 2, and 253.7 mA in case of a communication terminal in which a processing order is 3.

For ease of calculation, it is assumed that such time that a status of FIG. 22C is realized from FIG. 22A through FIG. 22B is sufficiently small, and the communication terminals 2a, 2b, 2c made calls for 20 minutes and terminated the calls at the same time. In this case, battery remaining quantity of FIG. 23A is calculated as follows.

$$\text{(Battery remaining quantity of each communication terminal in } Fig.\ 23A) - \text{(average consumption current of each communication terminal in a call status)} \times \text{(call time)}$$

Battery remaining quantity of the communication terminal 2a becomes the following value.

$$300 - 134.8 \times 20/60 \approx 255.1\ (\text{mAh})$$

Battery remaining quantity of the communication terminal 2b becomes the following value.

$$500 - 194.4 \times 20/60 = 435.2\ (\text{mAh})$$

Battery remaining quantity of the communication terminal 2c becomes the following value.

$$700 - 253.7 \times 20/60 \approx 615.4\ (\text{mAh})$$

In this case, call time is almost the same, but a maximum difference of battery remaining quantity is reduced from 400 mAh to 360.3 mAh, and it means that equation of battery remaining quantity was realized.

This embodiment described such a case that there are three units of communication terminals, but it is needless to say that the number of communication terminals may be any number. In addition, it described a case of voice data, but it is needless to say that data of each communication terminal may be of a similar size and be periodic. In addition, it described a case of a certain assumed value for the purpose of calculation, but it is needless to say that it may not be the assumed value.

In addition, it described such a case that each communication terminal notifies actively battery remaining quantity to a management terminal, but it is needless to say that it may be configured in such a manner that a management terminal requests each communication terminal for notification of battery remaining quantity and each communication terminal notifies battery remaining quantity in accordance with the request. In addition, it simply described that each communication terminal notifies battery remaining quantity, but it is needless to say that each communication terminal may notify battery remaining quantity by a dedicated frame and may notify by adding information which shows battery remaining quantity, to a normal frame. In addition, it described such a case that an order of communication is determined on the basis of battery remaining quantity which was notified from a communication terminal at the time of start of a call, but it is needless to say that the order of communication may be changed even in mid-course of a call, on the basis of battery remaining quantity which was updated in mid-course of a call.

As above, according to this embodiment, it is a communication system which is configured by a management terminal which manages a medium and a communication terminal which is managed by the management terminal and in which power on and power off can be changed at arbitrary timing, and the communication terminal turns on power in tune with start of each reference frame of the management terminal, and turns off power when transmission/reception of all frames to/from the management terminal is completed, and the communication terminal notifies battery remaining quantity to the management terminal, and a processing order of communication terminals is determined on the basis of battery remaining quantity, and thereby, the management terminal can process a frame.

That is, the management terminal further comprises a battery remaining quantity obtaining unit which obtains battery remaining quantity from each of a plurality of communication terminals, and the processing order determination unit determines a processing order, on the basis of battery remaining quantity which was obtained by the battery remaining quantity obtaining unit.

Therefore, if it is determined that the management terminal processes a frame in the order corresponding to a communication terminal in which battery remaining quantity is few, it is possible to shorten power on time, easier in case of a communication terminal in which battery remaining quantity is few, and therefore, it is possible to obtain such a favorable advantage that it is possible to carry out equation of battery remaining quantity.

This application is based upon and claims the benefit of priority of Japanese Patent Applications No. 2004-342222 filed on Nov. 26, 2004 and 2005-162275 filed on Jun. 2, 2005, the contents of which are incorporated herein by reference in its entirety.

What is claimed is:

1. A communication terminal which transmits/receives a frame to/from a management terminal which is connected to a first network, through a second network, the communication terminal comprising:
    a frame reception section which receives a frame which is transmitted to the management terminal by another communication terminal;
    a power off section which turns off power of the communication terminal, during a period of power off time determined on the basis of a transmission time indicated by the content of the received frame;
    a frame content readout section which reads out a content stored in the frame which is received by the frame reception section;
    a power off time setup section which sets up a power off time for turning off power of the communication terminal, on the basis of the content of the frame which is read out by the frame content readout section, wherein
    the power off section turns off power of the communication terminal, during a period of the power off time which is set up by the power off time setup section and determined on the basis of the transmission time indicated by the content of the received frame; and
    a time judgment section which judges whether the power off time, set up by the power off time setup section, exceeds a predetermined time or not, wherein
    the power off section, in case of a judgment by the time judgment section that the power off time exceeds the predetermined time, turns off power of the communication terminal, during the period of the power off time.

2. The communication terminal according to claim 1, wherein the frame content readout section reads out contents of a header, a frame body and a frame check sequence of the frame received by the frame reception section.

3. The communication terminal according to claim 1, wherein:
    the power off time setup section has a power off time calculation section which calculates the transmission time of the frame,
    the frame content readout section reads out such a frame sequence that a plurality of frames continue in terms of time, from the frame received by the frame reception section,
    the power off time calculation section calculates a transmission time of the frame sequence read out by the frame content readout section, and
    the power off section turns off power of the communication terminal, during a period of the transmission time calculated by the power off time calculation section.

4. The communication terminal according to claim 1, wherein the frame content readout section reads out a content which was stored in a header of the frame received by the frame reception section.

5. The communication terminal according to claim 4, wherein the header of the frame comprises a physical header.

6. The communication terminal according to claim 1, wherein the content of the received frame is a transmission time of another communication terminal.

7. The communication terminal according to claim 1, wherein the communication terminal carries out the power off operation in a competition period based on the IEEE802.11 standard.

8. A communication method to transmit/receive a frame to/from a management terminal which is connected to a first network, through a second network, the communication method comprising:
    receiving, via a frame reception section, a frame which is transmitted to the management terminal by another communication terminal;
    turning off power, via a power off section, of the communication terminal, during a period of power off time determined on the basis of a transmission time indicated by the content of the received frame;
    reading out a content, via a frame content readout section, stored in the frame which is received by the frame reception section;
    setting up a power off time, via a power off time setup section, for turning off power of the communication terminal, on the basis of the content of the frame which is read out by the frame content readout section, wherein the power off section turns off power of the communication terminal, during a period of the power off time which is set up by the power off time setup section and determined on the basis of the transmission time indicated by the content of the received frame;
    judging whether the power off time, which is set up by the power off time setup section, exceeds a predetermined time or not; and
    when it is judged that the power off time exceeds the predetermined time, turning off power of the communication terminal during the period of the power off time.

* * * * *